United States Patent
Tsuji et al.

(10) Patent No.: US 7,094,833 B2
(45) Date of Patent: Aug. 22, 2006

(54) BLOCK COPOLYMER

(75) Inventors: Ryotaro Tsuji, Settsu (JP); Tomoki Hiiro, Settsu (JP)

(73) Assignee: Kaneka Corporation

( * ) Notice: Subject to any disclaimer, the term of this patent is extended or adjusted under 35 U.S.C. 154(b) by 17 days.

(21) Appl. No.: 10/482,963

(22) PCT Filed: Jul. 1, 2002

(86) PCT No.: PCT/JP02/06656

§ 371 (c)(1),
(2), (4) Date: Jan. 7, 2004

(87) PCT Pub. No.: WO03/008474

PCT Pub. Date: Jan. 30, 2003

(65) Prior Publication Data

US 2004/0236020 A1    Nov. 25, 2004

(30) Foreign Application Priority Data

Jul. 16, 2001  (JP) .............................. 2001-215707
Jul. 30, 2001  (JP) .............................. 2001-230295

(51) Int. Cl.
*C08F 251/00*  (2006.01)
*C08F 255/02*  (2006.01)

(52) U.S. Cl. .................. 525/89; 525/230; 525/244; 525/261; 525/293; 525/250; 526/224

(58) Field of Classification Search ................... 525/89, 525/230, 350, 244, 261, 293, 250; 526/224
See application file for complete search history.

(56) References Cited

U.S. PATENT DOCUMENTS

| | | | | |
|---|---|---|---|---|
| 6,153,705 A * | 11/2000 | Corpart et al. | ............... | 525/244 |
| 6,355,718 B1 * | 3/2002 | Berge et al. | ................. | 524/461 |
| 6,512,081 B1 * | 1/2003 | Rizzardo et al. | ............ | 528/340 |
| 6,642,318 B1 * | 11/2003 | Chiefari et al. | ............. | 525/261 |
| 6,825,290 B1 * | 11/2004 | Adam et al. | ................... | 526/75 |

FOREIGN PATENT DOCUMENTS

| | | |
|---|---|---|
| JP | 2000-154329 | 6/2000 |
| JP | 2002-241568 | 8/2002 |
| WO | WO 98/01478 | 1/1998 |
| WO | WO 99/05099 | 2/1999 |
| WO | WO 99/31144 | 6/1999 |

* cited by examiner

*Primary Examiner*—James J. Seidleck
*Assistant Examiner*—Olga Asinovsky
(74) *Attorney, Agent, or Firm*—Kenyon & Kenyon LLP

(57) ABSTRACT

Provided are a block copolymer including a polymer block containing acrylonitrile or methacrylonitrile as a principal constituent, which is excellent in heat resistance, weatherability, oil resistance, flame retardancy, and low-temperature resistance and which can be economically produced; and a thermoplastic resin composition and an elastomer composition each containing the block copolymer. The block copolymer is produced by reversible addition-fragmentation chain transfer polymerization in the presence of a thiocarbonylthio group-containing compound.

17 Claims, No Drawings

BLOCK COPOLYMER

RELATED APPLICATION

This application is a nationalization of PCT application PCT/JP02/06656 filed on Jul. 1, 2002, claiming priority to Japanese Application No. 2001-215707 filed on Jul. 16, 2001 and Japanese Application No. 2001-230295 filed on Jul. 30, 2001.

TECHNICAL FIELD

The present invention relates to block copolymers. More particularly, the invention relates to a block copolymer including a polymer block which contains a monomer selected from the group consisting of acrylonitrile and methacrylonitrile as a principal constituent. Furthermore, the present invention relates to a thermoplastic resin composition or elastomer composition containing the block copolymer as an essential component.

BACKGROUND ART

Materials in which acrylonitrile or methacrylonitrile is polymerized have been widely used because of their excellent heat resistance, weatherability, oil resistance, flame retardancy, etc. Commonly known examples thereof include acrylonitrile-styrene-acrylic rubber copolymer resins (AAS), acrylonitrile-ethylene-styrene copolymer resins (AES), acrylonitrile-styrene copolymer resins (AS), acrylonitrile-butadiene-styrene copolymer resins (ABS), acrylonitrile-chlorinated polyethylene-styrene resins (ACS), acrylonitrile-butadiene copolymer rubber (NBR), and hydrogenated nitrile rubber.

However, all of these materials are formed by random copolymerization of acrylonitrile and other monomers or by graft copolymerization of acrylonitrile onto polymer chains. With respect to block copolymers including polymer blocks containing acrylonitrile and methacrylonitrile as principal constituents, although research has been conducted on the laboratory level, no production has been performed industrially.

In general, in an acrylonitrile-containing polymer, as the acrylonitrile content is increased, oil resistance, wear resistance, heat resistance, and strength are improved, while low-temperature resistance tends to be degraded. In contrast, in a block copolymer in which a polymer block containing acrylonitrile or methacrylonitrile as a principal constituent and a flexible polymer block composed of other constituents, low-temperature resistance is considered to be improved while maintaining excellence in heat resistance, oil resistance, etc.

As the methods for synthesizing block copolymers, living polymerization methods are usually used. Examples of living polymerization methods include living cationic polymerization methods, living anionic polymerization methods, and living radical polymerization methods. Among them, living radical polymerization methods are most useful because of the applicability to a wide variety of monomers and also because of the applicability to water-based polymerization. Commonly known examples of the living radical polymerization methods include a method using nitroxyl radicals, such as 2,2,6,6-tetramethyl-1-piperidinyloxy (TEMPO) radicals, described in Junpo He et al., Polymer, 2000, 41, p. 4573; and an atom transfer radical polymerization method described in Matyjaszewski et al., J. Am. Chem. Soc., 1995, 117, p. 5614. However, in the method using nitroxyl radicals, little has been reported about the polymerization of monomers other than styrene, and no example has been known about the polymerization of acrylonitrile. Furthermore, in general, since the polymerization temperature must be 120° C. or more, this method is not economical for industrial production. On the other hand, in the atom transfer radical polymerization, since nitrile groups coordinate to a metal complex which is a catalyst, polymerization does not proceed satisfactorily. Furthermore, a complicated purification step is required in order to remove the metal complex from the polymer, thus being uneconomical. Additionally, in the living radical polymerization methods described above, it is generally difficult to perform water-based polymerization, such as emulsion polymerization or suspension polymerization. In the living radical polymerization methods described above, there are cases in which it is difficult to perform water-based polymerization, such as emulsion polymerization or suspension polymerization.

DISCLOSURE OF INVENTION

The present invention has been achieved to overcome the problems associated with the conventional techniques. It is an object of the present invention to provide a block copolymer including a polymer block containing acrylonitrile or methacrylonitrile as a principal constituent, which is excellent in heat resistance, weatherability, oil resistance, flame retardancy, and low-temperature resistance and which can be economically produced. It is another object of the present invention to provide a thermoplastic resin composition or elastomer composition containing the block copolymer.

A block copolymer of the present invention includes a polymer block (A) and a polymer block (B), the block copolymer being produced by forming the polymer block (A) by reversible addition-fragmentation chain transfer polymerization in the presence of a thiocarbonylthio group-containing compound, and then by forming the polymer block (B).

The polymer block (A) is prepared by (co)polymerizing 50% to 100% by weight of at least one monomer selected from the group consisting of acrylonitrile and methacrylonitrile and 50% to 0% by weight of at least one monomer selected from the group consisting of methacrylate esters, styrene, and α-methylstyrene.

The polymer block (B) is prepared by (co)polymerizing at least one monomer selected from the group consisting of acrylic acid, methacrylic acid, acrylate esters, methacrylate esters, vinyl acetate, styrene, α-methylstyrene, butadiene, isoprene, and vinyl chloride.

A block copolymer of the present invention may be produced by separately forming the polymer block (A) and the polymer block (B), each by a reversible addition-fragmentation chain transfer polymerization method in the presence of a thiocarbonylthio group-containing compound, and then by coupling the polymer block (A) and the polymer block (B).

The block copolymer of the present invention can be of various types. Examples of types include, but are not limited to, an A-B diblock copolymer including the polymer block (A) and the polymer block (B), an A-B-A triblock copolymer, a B-A-B triblock copolymer, an (A-B)n multiblock copolymer, and a branched block copolymer. Polymers produced by linking monomers other than the ones described above to such polymers may also be acceptable. Examples thereof include an A-B-C polymer including a polymer chain C formed by a monomer other than the ones described above.

The block copolymer of the present invention is produced by a reversible addition-fragmentation chain transfer (RAFT) method in the presence of a thiocarbonylthio group-containing compound. RAFT polymerization methods are disclosed, for example, in PCT Publication No. WO98/01478; PCT Publication No. WO99/05099; PCT Publication No. WO99/31144; Macromolecules, 1998, 31, p. 5559; Macromolecules, 1999, 32, p. 2071; Macromolecules, 1999, 32, p. 6977; and Macromolecules, 2000, 33, p. 243.

That is, the monomers for forming the polymer block (A) are polymerized in the presence of a thiocarbonylthio group-containing compound to form the polymer block (A). The monomers for forming the polymer block (B) are then polymerized to form the polymer block (B) linked to the polymer block (A). Thereby, a block copolymer including the polymer block (A) and the polymer block (B) is produced. In this method, the thiocarbonylthio group-containing compound functions as a chain transfer agent, and the resultant block copolymer contains at least one thiocarbonylthio group in each molecule. The block copolymers including the polymer blocks (A) and the polymer blocks (B) are, as necessary, subjected to a coupling reaction to produce a triblock copolymer, such as the A-B-A or B-A-B type; or a multiblock copolymer, such as the (A-B)n type. It is also possible to produce a block copolymer by forming the polymer block (A) and the polymer block (B) separately, each in the presence of a thiocarbonylthio group-containing compound, and then by coupling the polymer block (A) and the polymer block (B).

When the block copolymers, or the polymer blocks (A) and (B), are coupled to each other, the block copolymers preferably have functional groups at the ends in view of the fact that coupling can be performed easily and reliably. In the present invention, the thiocarbonylthio groups introduced into the polymer by the method described above can be used as such functional groups.

When the thiocarbonylthio group-containing copolymers are subjected to a coupling reaction, for example, first, the copolymers are allowed to react with a processing agent composed of at least one compound selected from the group consisting of bases, acids, and hydrogen-nitrogen bond-containing compounds to convert the thiocarbonylthio groups of the copolymers into mercapto groups or mercaptide groups. Next, coupling of the copolymers is performed using the mercapto groups or mercaptide groups. The block copolymer with the desired type is thereby obtained.

The polymer block (A) is prepared by (co)polymerizing 50% to 100% by weight of at least one monomer selected from the group consisting of acrylonitrile and methacrylonitrile and 50% to 0% by weight of at least one monomer selected from the group consisting of methacrylate esters, styrene, and α-methylstyrene.

Because of the excellence in oil resistance and flame retardancy of the resultant block copolymer, the polymer block (A) is prepared preferably by polymerizing 80% to 100% of at least one monomer selected from the group consisting of acrylonitrile and methacrylonitrile and 20% to 0% of at least one monomer selected from the group consisting of methacrylate esters, styrene, and α-methylstyrene, and more preferably by polymerizing 100% by weight of at least one monomer selected from the group consisting of acrylonitrile and methacrylonitrile. With respect to the amounts of acrylonitrile and methacrylonitrile used, in view of availability and cost, preferably 50% by weight or more of acrylonitrile is polymerized, more preferably 80% by weight or more of acrylonitrile is polymerized, and most preferably 100% by weight of acrylonitrile is polymerized.

In view of the strength and workability of the resultant block copolymer, the molecular weight distribution, which is determined by gel permeation chromatography analysis, of the polymer block (A) is preferably 1.8 or less, and more preferably 1.5 or less. In the present invention, the molecular weight distribution (Mw/Mn) is a value corresponding to the ratio of the weight-average molecular weight (Mw) to the number-average molecular weight (Mn) determined by gel permeation chromatography analysis.

In view of the strength and workability of the resultant block copolymer, the number-average molecular weight of the polymer block (A) is preferably in the range of 1,000 to 500,000, and more preferably in the range of 3,000 to 100,000.

Because of the excellence in heat resistance and strength of the resultant block copolymer, the glass transition temperature of the polymer block (A) is preferably 50° C. or more, and more preferably 80° C. or more. In the present invention, the glass transition temperature (Tg) is determined according to the following equation:

$$(1/Tg) = (W_1/Tg_1) + (W_2/Tg_2) + \ldots + (W_m/Tg_m)$$

(wherein $Tg_1$, $Tg_2$, ..., $Tg_m$ are the glass transition temperatures correspond to monomers used for polymerization when they are homopolymerized, respectively; $W_1$, $W_2$, ..., $W_m$ are the weight fractions of the monomer components used for polymerization in the polymer block, respectively; and the relationship $W_1+W_2+ \ldots W_m=1$ is satisfied). Additionally, the above equation is generally known as the Fox equation. With respect to the glass transition temperatures of the individual homopolymers ($Tg_1$, $Tg_2$, ..., $Tg_m$), for example, the values described in Polymer Handbook Third Edition (Wiley-Interscience, 1989) may be used.

Among the monomers constituting the polymer block (A), as at least one monomer selected from the group consisting of methacrylate esters, styrene, and α-methylstyrene, because of the excellence in oil resistance, weatherability, and heat resistance, methacrylate esters are preferable. Examples of such methacrylate esters include, but are not limited to, alkyl esters, aryl esters, and aralkyl esters of methacrylic acid. Examples of methacrylate esters include, but are not limited to, methyl methacrylate, ethyl methacrylate, n-butyl methacrylate, isobutyl methacrylate, tert-butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, 2-methacryloyloxypropyltrimethoxysilane, 2-methacryloyloxypropyldimethoxymethylsilane, trifluoromethyl methacrylate, pentafluoroethyl methacrylate, 2-aminoethyl methacrylate, 2-(N,N-dimethylamino)ethyl methacrylate, 3-aminopropyl methacrylate, 3-(N,N-diethylamino)propyl methacrylate, and 2,2,2-trifluoroethyl methacrylate. These compounds may be used alone or in combination. Among these methacrylate esters, because of the excellence in heat resistance, weatherability, oil resistance, and strength of the resultant copolymers, methacrylate esters of alcohols containing 4 or less carbon atoms, such as methyl methacrylate, ethyl methacrylate, and n-butyl methacrylate, are preferable, and methyl methacrylate is particularly preferable.

Additionally, by adding methacrylate esters having functional groups, when the resultant block copolymers are molded, crosslinking reactions can be carried out using the functional groups. Thereby, molded objects having excellent strength and compression set can be produced. It is also possible to produce molded objects having excellent compatibility with various resins and rubbers using the functional groups. Examples of such functional groups include, but are not limited to, a hydroxyl group, an amino group, an epoxy group, a carboxyl group, and a crosslinkable silyl group. Examples of the methacrylate esters containing such functional groups include, but are not limited to, hydroxyl group-containing methacrylate esters, such as 2-hydroxyethyl methacrylate and 2-hydroxypropyl methacrylate, amino group-containing methacrylate esters, such as 2-aminoethyl methacrylate and 3-aminopropyl methacrylate; epoxy group-containing methacrylate esters, such as glycidyl methacrylate; carboxyl group-containing methacrylate esters, such as 3-methacryloyloxypropanoic acid and 4-methacryloyloxybenzoic acid; and crosslinkable silyl group-containing methacrylate esters, such as 2-methacryloyloxypropyltrimethoxysilane and 2-methacryloyloxypropyldimethoxymethylsilane. Alternatively, after the monomers are polymerized, carboxyl groups may be introduced by hydrolysis. These methacrylate esters may be used alone or in combination. If the content of the functional group-containing methacrylate ester is too high, it may be brittle when the block copolymer is formed and crosslinked. Therefore, the content of the functional group-containing methacrylate ester is preferably less than 10% by weight, and more preferably less than 5% by weight, of the polymer block (A). However, this does not apply to the case when functional groups are introduced in order to improve compatibility with various resins, rubbers, etc.

As described above, the polymer block (B) in the block copolymer of the present invention is composed of at least one monomer selected from the group consisting of acrylic acid, methacrylic acid, acrylate esters, methacrylate esters, vinyl acetate, styrene, α-methylstyrene, butadiene, isoprene, and vinyl chloride. These monomers may be used alone or in combination. Additionally, after the polymerization, the vinyl acetate unit may be saponified, the butadiene unit or isoprene unit may be hydrogenated, or the butadiene unit, isoprene unit, or vinyl chloride unit may be chlorinated.

Among the monomers constituting the polymer block (B), examples of acrylate esters include, but are not limited to, alkyl esters, aryl esters, and aralkyl esters of acrylic acid. Examples of acrylate esters include, but are not limited to, methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, acrylate of alkyl-modified dipentaerythritol, ethylene oxide-modified bisphenol A diacrylate, carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonandiol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, 2-aminoethyl acrylate, 2-(N,N-dimethylamino)ethyl acrylate, 3-aminopropyl acrylate, 3-(N,N-diethylamino)propyl acrylate, and allyl acrylate.

Among the monomers constituting the polymer block (B), the methacrylate ester is not particularly limited. Examples of methacrylate esters are the same as those described above with reference to the polymer block (A).

Among the monomers constituting the polymer block (B), in view of heat resistance and weatherability, acrylate esters and methacrylate esters are preferable; in view of flexibility, acrylate esters are preferable; and in view of availability and cost, acrylate esters of alcohols containing 4 or less carbon atoms, such as ethyl acrylate, n-propyl acrylate, n-butyl acrylate, and tert-butyl acrylate are more preferable. When the block copolymers of the present invention are used as textiles, in view of texture, surface properties, and flame retardancy, vinyl chloride is preferably used. When the block copolymers of the present invention are used as modifiers for polar resins, such as polyester resins and polycarbonate resins, preferred monomers for use are as follows: acrylic acid, methacrylic acid, functional group-containing acrylate esters and functional group-containing methacrylate esters, such as hydroxyl group-containing acrylate esters, hydroxyl group-containing methacrylate esters, amino group-containing acrylate esters, amino group-containing methacrylate esters, carboxyl group-containing acrylate esters, carboxyl group-containing methacrylate esters, epoxy group-containing acrylate esters, epoxy group-containing methacrylate esters, silyl group-containing acrylate esters, and silyl group-containing methacrylate esters.

The monomers constituting the polymer block (B) are preferably selected based on the following criteria. For example, because of the excellence in flexibility and low-temperature resistance of the resultant block copolymer, the glass transition temperature of the polymer prepared by polymerizing the monomers only is 30° C. or less, and more preferably 0° C. or less. The glass transition temperature of the polymer block (B) is determined according to the Fox equation as in the polymer block (A).

In view of the strength and workability of the resultant block copolymer, the molecular weight distribution, which is determined by gel permeation chromatography analysis, of the polymer prepared by polymerizing only the monomers constituting the polymer block (B) is preferably 1.8 or less, and more preferably 1.5 or less.

Furthermore, in view of flexibility and elasticity, the number-average molecular weight, which is determined by gel permeation chromatography analysis, of the polymer prepared by polymerizing only the monomers constituting the polymer block (B) is preferably in the range of 1,000 to 1,000,000, more preferably in the range of 3,000 to 500,000, and most preferably in the range of 5,000 to 200,000.

As described above, the block copolymer of the present invention is produced by forming the polymer block (A) and then by forming the polymer block (B), and furthermore by coupling them to each other. Alternatively, the polymer block (A) and the polymer block (B) are formed separately, and then coupling is performed. In view of workability and the excellence in compatibility when the block copolymer is mixed with resins, rubbers, or the like, the molecular weight distribution, which is determined by gel permeation chromatography analysis, of the block copolymer is preferably 1.8 or less, and more preferably 1.6 or less.

The thiocarbonylthio group-containing compound used as a chain transfer agent in the radical polymerization described above is at least one compound selected from the group consisting of a compound represented by general formula (1):

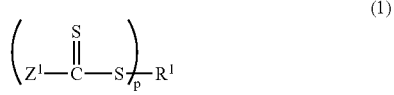
(1)

(wherein $R^1$ is a p-valent organic group of 1 or more carbon atoms which may contain one of nitrogen, oxygen, sulfur, halogen, silicon, phosphorus, and metal atoms, or which may be a polymer; $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; when plural $Z^1$s are present, the plural $Z^1$s may be the same or different; and p is an integer of 1 or more), and a compound represented by general formula (2):

(2)

(wherein $R^2$ is a monovalent organic group of 1 or more carbon atoms which may contain one of nitrogen, oxygen, sulfur, halogen, silicon, phosphorus, and metal atoms, or which may be a polymer; $Z^2$ is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, or which may be a polymer; plural $R^2$s may be the same or different; and q is an integer of 2 or more).

In the compound having the thiocarbonylthio structure represented by general formula (1), $R^1$ is not particularly limited. In view of availability of the compound, preferably, $R^1$ has 1 to 20 carbon atoms, and p is 6 or less. Examples of $R^1$ include alkyl, substituted alkyl, aralkyl, substituted aralkyl, a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound and polymerization activity, $R^1$ is preferably benzyl, 1-phenylethyl, 2-(2-phenylpropyl), 1-acetoxyethyl, 1-(4-methoxyphenyl)ethyl, ethoxycarbonylmethyl, 2-(2-ethoxycarbonylpropyl), 2-(2-cyanopropyl), tert-butyl, 1,1,3,3-tetramethylbutyl, 2-(2-(p-chlorophenyl)propyl), vinylbenzyl, tert-butylthio, 2-carboxylethyl, carboxylmethyl, cyanomethyl, 1-cyanoethyl, 2-(2-cyanobutyl), or any one of organic groups represented by the following formulae.

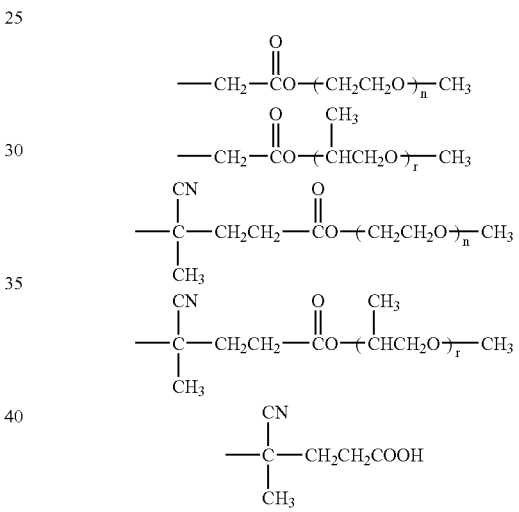

(In the formulae, n is an integer of 1 or more, and r is an integer of 0 or more.)

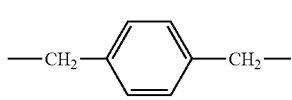 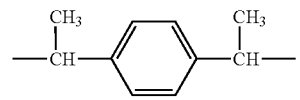 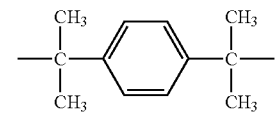

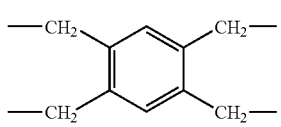 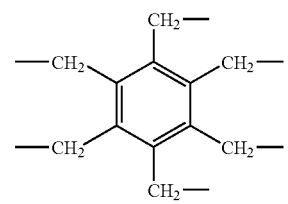 

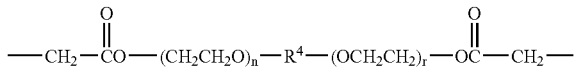

-continued

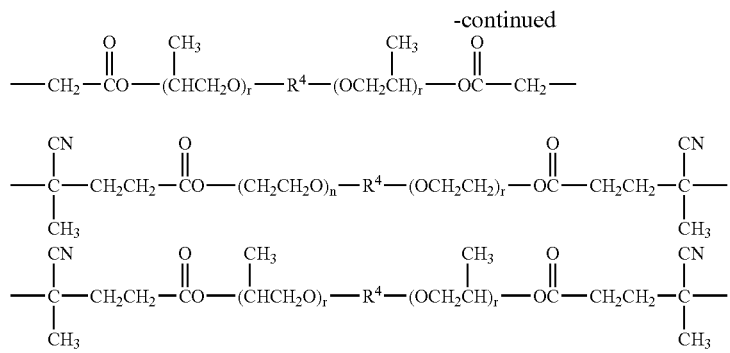

(In the formulae, R⁴ is a divalent organic group of 1 or more carbon atoms; n is an integer of 1 or more; r is an integer of 0 or more; and plural r's may be the same or different.)

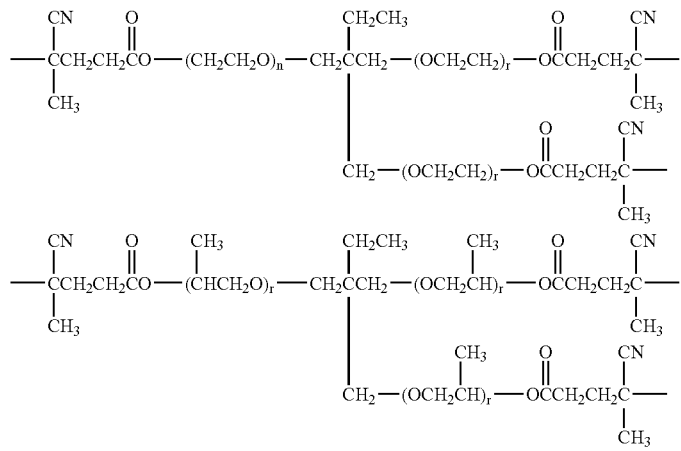

(In the formulae, n is an integer of 1 or more; r is an integer of 0 or more; and plural r's may be the same or different.)

In the above formulae, in view of availability of the compound, preferably, each of n and r is 500 or less. Preferably, R⁴ has 1 to 20 carbon atoms. Examples of R⁴ structures include, but are not limited to, —(CH₂)ₙ— (wherein n is an integer of 1 or more), —C₆H₄—, and —CH₂—C₆H₄—CH₂—.

In the compound having the thiocarbonylthio structure represented by general formula (1), $Z^1$ is not particularly limited. In view of availability of the compound and polymerization activity, when $Z^1$ is an organic group, preferably, the organic group has 1 to 20 carbon atoms. Examples of $Z^1$ include alkyl, substituted alkyl, alkoxy, aryloxy, aryl, substituted aryl, aralkyl, substituted aralkyl, heterocyclic, N-aryl-N-alkylamino, N,N-diarylamino, N,N-dialkylamino, thioalkyl, and dialkylphosphinyl groups. In view of availability of the compound, $Z^1$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, methylthio, phenoxy, phenylthio, N,N-dimethylamino, N,N-diethylamino, N-phenyl-N-methylamino, N-phenyl-N-ethylamino, benzylthio, pentafluorophenoxy, or any one of organic groups represented by formulae below.

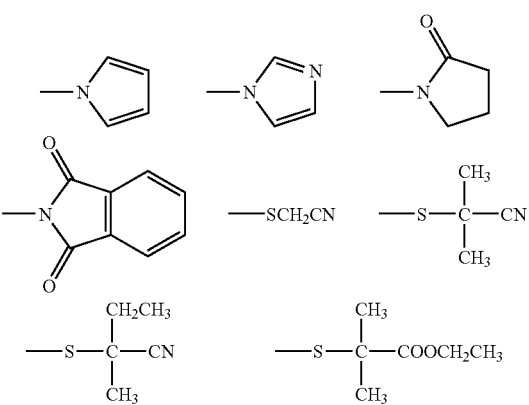

In the compound having the thiocarbonylthio structure represented by general formula (2), $R^2$ is not particularly limited. In view of availability of the compound and polymerization activity, preferably, $R^2$ has 1 to 20 carbon atoms. Examples of $R^2$ include alkyl, substituted alkyl, aralkyl, and substituted aralkyl. In view of availability of the compound, $R^2$ is preferably benzyl, 1-phenylethyl, 2-(2-phenylpropyl), 1-acetoxyethyl, 1-(4-methoxyphenyl)ethyl, ethoxycarbonylmethyl, 2-(2-ethoxycarbonylpropyl), 2-(2-cyanopropyl), tert-butyl, 1,1,3,3-tetramethylbutyl, 2-(2-(p-chlorophenyl)propyl), vinylbenzyl, tert-butylthio, 2-carboxylethyl, carboxylmethyl, cyanomethyl, 1-cyanoethyl, 2-(2-cyanobutyl), or any one of organic groups represented by formulae below, (wherein n is an integer of 1 or more, and r is an integer of 0 or more).

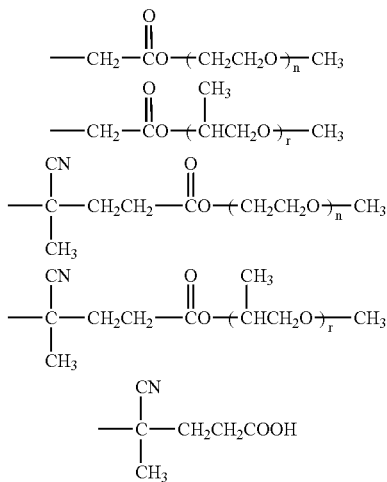

In the above formulae, each of n and r is preferably 500 or less in view of availability of the compound.

In the compound having the thiocarbonylthio structure represented by general formula (2), $Z^2$ is not particularly limited. In view of availability of the compound and polymerization activity, when $Z^2$ is an organic group, preferably, the organic group has 1 to 20 carbon atoms, and q is 6 or less. Examples of $Z^2$ include a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound, preferably $Z^2$ has any one of the structures represented by formulae below, (wherein n is an integer of 1 or more, and r is an integer of 0 or more).

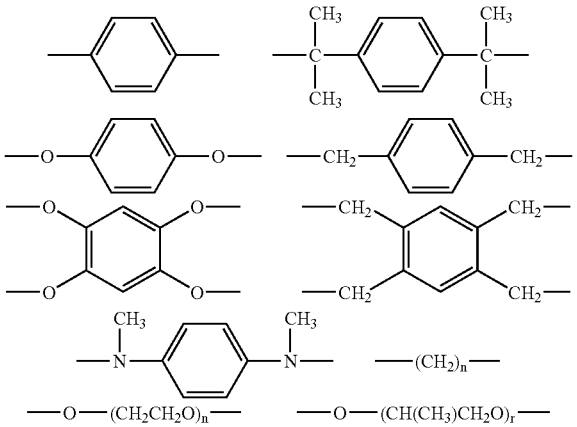

In the above formulae, each of n and r is preferably 500 or less in view of availability of the compound.

Among the thiocarbonylthio group-containing compounds used in the present invention, in view of availability and the fact that A-B diblock copolymers can be easily synthesized, preferred is a compound represented by general formula (3):

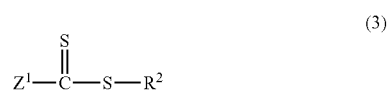

(wherein $R^2$ is a monovalent organic group of 1 or more carbon atoms which may contain one of nitrogen, oxygen, sulfur, halogen, silicon, phosphorus, and metal atoms, or which may be a polymer; and $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer). In view of availability of the compound and polymerization activity, preferably, $R^2$ has 1 to 20 carbon atoms. The specific examples of the structures of $R^2$ and $Z^1$ in the formula are the same as those described with reference to $R^2$ in general formula (2) and $Z^1$ in general formula (1), respectively.

In the present invention, when the polymer blocks (A) and (B) are synthesized separately and then are coupled to each other to produce an A-B-A triblock copolymer, because of ease in production, preferably, a compound represented by general formula (3) is used as the thiocarbonylthio group-containing compound used for the preparation of the polymer block (A); and a compound represented by general formula (4) below is used as the thiocarbonylthio group-containing compound used for the preparation of the polymer block (B):

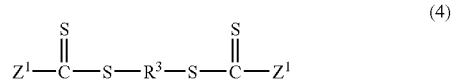

(wherein $R^3$ is a divalent organic group of 1 or more carbon atoms which may contain one of nitrogen, oxygen, sulfur, halogen, silicon, phosphorus, and metal atoms, or which may be a polymer; each $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; and two $Z^1$s may be the same or different). Specific examples of $Z^1$ structures in the formula are the same as those described with reference to $Z^1$ in general formula (1).

In the thiocarbonylthio group-containing compound represented by general formula (4), preferably, $R^3$ has 1 to 20 carbon atoms. Although $R^3$ is not particularly limited, in view of availability and polymerization activity, preferably, $R^3$ has any one of the structures represented by formulae below.

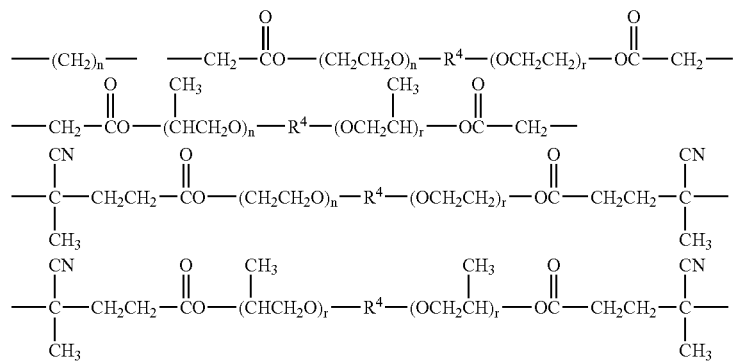

(In the above formulae, $R^4$ is a divalent organic group of 1 or more carbon atoms; n is an integer of 1 or more; r is an integer of 0 or more; and plural r's may be the same or different.)

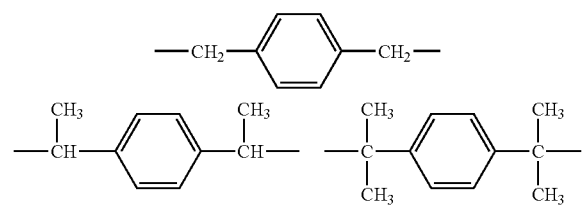

In the above formulae, each of n and r is preferably 500 or less in view of availability of the compound. Preferably, $R^4$ has 1 to 20 carbon atoms. Examples of $R^4$ structures include, but are not limited to, $-(CH_2)_n-$ (wherein n is an integer of 1 or more), $-C_6H_4-$, and $-CH_2-C_6H_4-CH_2-$.

Specific examples of compounds having the thiocarbonylthio structures, which are used in the present invention, include, but are not limited to, compounds represented by formulae below, (wherein Me, Et, Ph, and Ac represent methyl, ethyl, phenyl, and acetyl, respectively; $R^4$ is a divalent organic group of 1 or more carbon atoms; n is an integer of 1 or more; r is an integer of 0 or more; and plural r's may be the same or different).

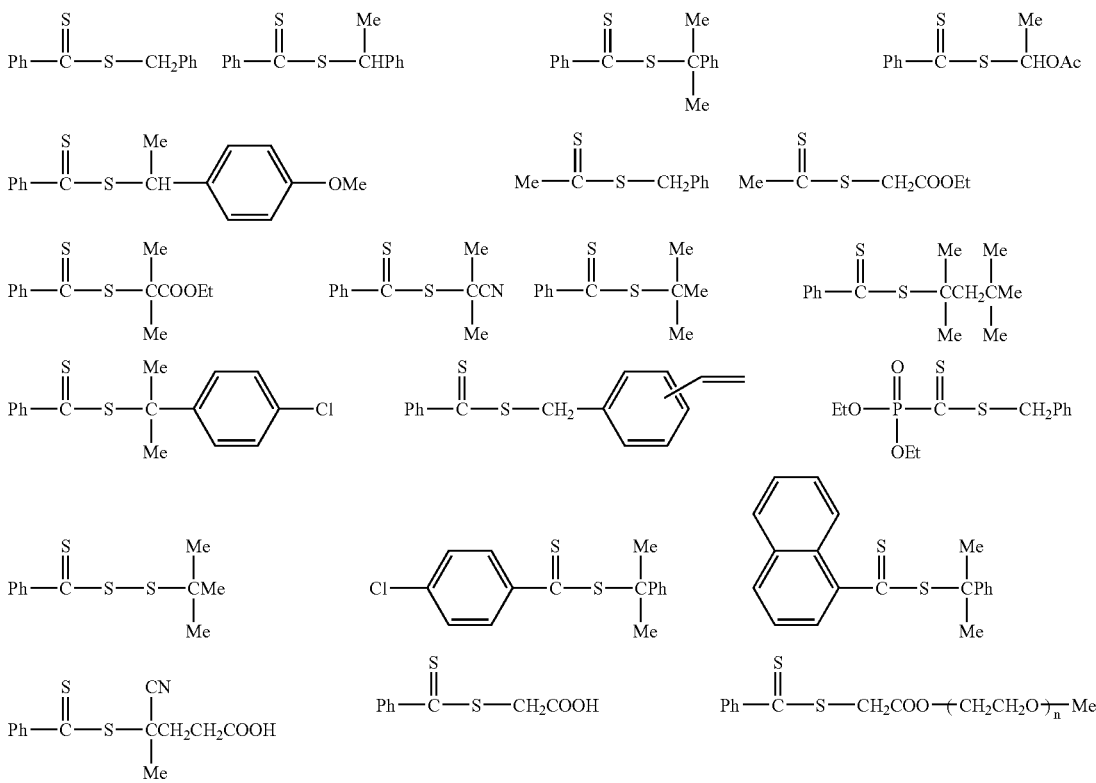

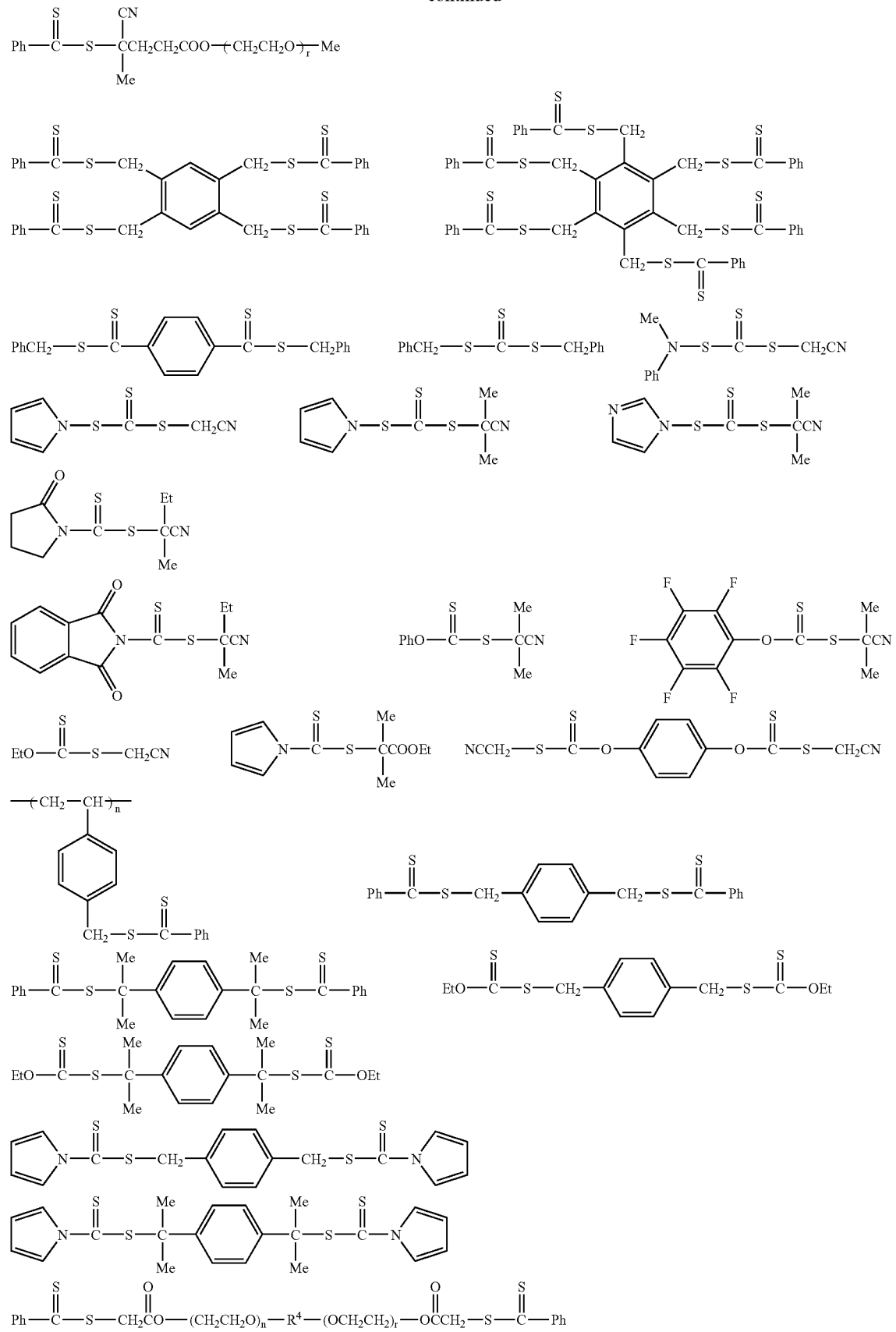

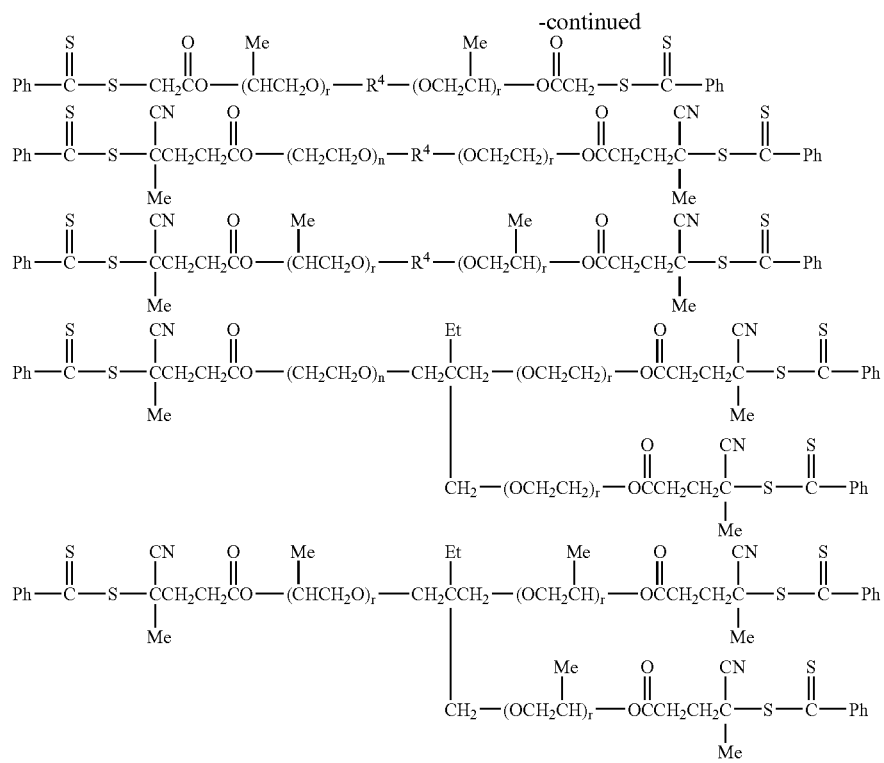

In the above formulae, each of n and r is preferably 500 or less in view of availability of the compound. Preferably, $R^4$ has 1 to 20 carbon atoms. Examples of $R^4$ structures include, but are not limited to, $-(CH_2)_n-$ (wherein n is an integer of 1 or more), $-C_6H_4-$, and $-CH_2-C_6H_4-CH_2-$.

The amount of the thiocarbonylthio group-containing compound used in the present invention is not particularly limited and can be stoichiometrically calculated based on the monomers used. In general, since the number of moles of the resultant polymer is substantially equal to the number of moles of the thiocarbonylthio group-containing compound, the molecular weight of the polymer can be controlled by adjusting the molar ratio of the monomers to the thiocarbonylthio group-containing compound. When the rate of reaction of the monomers is 100%, the theoretical molecular weight of the resultant polymer is represented by $(x/y) \times Mm + Mr$, wherein Mm is the molecular weight of the monomers used, x is the number of moles of the monomers used, Mr is the molecular weight of the thiocarbonylthio group-containing compound, and y is the number of moles of the thiocarbonylthio group-containing compound used. Consequently, the amount of the thiocarbonylthio group-containing compound used may be calculated based on the number-average molecular weight of the desired polymer.

The technique used for radical polymerization is not particularly limited when the block copolymer of the present invention is prepared. Any method commonly used in the art, such as bulk polymerization, solution polymerization, emulsion polymerization, suspension polymerization, or microsuspension polymerization, may be employed. Among them, in view of cost and safety, water-based polymerization, such as emulsion polymerization, suspension polymerization, or microsuspension polymerization, is preferred.

In the case of solution polymerization of the monomers, examples of solvents which may be used include, but are not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, dibutyl ether, dioxane, ethylene glycol dimethyl ether, and ethylene glycol diethyl ether; amide solvents, such as dimethylformamide, diethylformamide, dimethylacetamide, and diethylacetamide; and aromatic petroleum solvents, such as toluene, xylene, benzene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of solvent used may be determined in consideration of the solubility of the monomers used, the solubility of the resultant polymer, the polymerization initiator concentration and the monomer concentration suitable for achieving a satisfactory reaction rate, the solubility of the thiocarbonylthio group-containing compound, effects on human body and environment, availability, cost, etc., and are not particularly limited. In view of solubility, availability, and cost, industrially, toluene, dimethylformamide, tetrahydrofuran, and acetone are preferable, and dimethylformamide and toluene are more preferable.

In the present invention, in the case of emulsion polymerization or microsuspension polymerization of the monomers, examples of emulsifiers which may be used include, but are not limited to, anionic surfactants, such as fatty acid soap, rosin acid soap, sodium naphthalenesulfonate-formalin condensates, sodium alkylsulfonate (e.g., sodium dodecyl sulfonate), sodium alkylbenzene sulfonate, sodium alkylsulfate (e.g., sodium dodecyl sulfate), ammonium alkylsulfate, triethanolamine alkylsulfate, sodium dialkylsulfosuccinate, sodium alkyldiphenylether disulfonate, sodium polyoxyethylene alkyl ether sulfate, and sodium polyoxyethylene alkylphenyl ether sulfate; nonionic surfactants, such as polyoxyethylene alkyl ether, polyoxyethylene higher alcohol ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene aklylamine, and alkyl alkanolamide; and cationic surfactants, such as alkyltrimethylammonium chloride. These emulsifiers may be used alone or in combination. As necessary, a cationic surfactant, such as an alkylamine hydrochloride, may be used, or a dispersant for suspension polymerization which will be described below may also be added. The amount of the emulsifier used is not particularly limited. Because of good emulsification state and the fact that polymerization proceeds smoothly, the amount of the emulsifier is preferably 0.1 to 20 parts by weight based on 100 parts by weight of the monomers. Among the emulsifiers described above, in view of stability of the emulsification state, nonionic surfactants are preferable. Additionally, in order to stabilize the emulsification state, various emulsifying aids may also be used. Examples of emulsifying aids include, but are not limited to, linear hydrocarbons, such as hexadecane; hydrocarbon polymers, such as polyethylene, polypropylene, polybutadiene, and hydrogenated polybutadiene; polar organic solvents, such as acetone, ethanol, and methanol; and higher alcohols, such as octyl alcohol, decyl alcohol, and lauryl alcohol. The amount of the emulsifying aid used is not particularly limited. Because of excellence in the balance between cost and effect, the amount of the emulsifying aid used is preferably 0.1 to 20 parts by weight, and more preferably 0.5 to 15 parts by weight, based on 100 parts by weight of the emulsifier.

In the case of suspension polymerization of the monomers, any dispersant commonly used may be used. Examples of dispersants include, but are not limited to, partially saponified poly(vinyl acetate), poly(vinyl alcohol), methyl cellulose, carboxymethyl cellulose, gelatin, poly(alkylene oxide), and combinations of anionic surfactants and dispersing agents. These may be used alone or in combination. The emulsifier used for emulsion polymerization described above may also be used as necessary. The amount of the dispersant used is not particularly limited. Because of the fact that polymerization proceeds smoothly, the amount of the dispersant is preferably 0.1 to 20 parts by weight based on 100 parts by weight of the monomers used.

The polymerization initiator or polymerization initiation method used for the radical polymerization is not particularly limited, and any polymerization initiator or polymerization initiation method commonly used may be employed. Examples of polymerization initiators include, but are not limited to, peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, tert-butyl hydroperoxide, cumene hydroperoxide, diisopropylbenzene hydroperoxide, p-menthane hydroperoxide, 1,1,3,3-tetramethylbutyl hydroperoxide, di-tert-butyl peroxide, tert-butyl-α-cumyl peroxide, di-α-cumyl peroxide, 1,4-bis[(tert-butylperoxy)isopropyl]benzene, 1,3-bis[(tert-butylperoxy)isopropyl]benzene, 2,5-dimethyl-2,5-bis(tert-butylperoxy) hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzoylperoxy) hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl) peroxy dicarbonate, bis(2-ethoxyethyl)peroxy dicarbonate, bis(4-tert-butylcyclohexyl)peroxy dicarbonate, O-tert-butyl-O-isopropylperoxy carbonate, and succinic acid peroxide; azo polymerization initiators, such as 2,2'-azobis-(2-amidinopropane)dihydrochloride, dimethyl 2,2'-azobis(isobutyrate), 2,2'-azobis-(4-methoxy-2,4-dimethylvaleronitrile), 2,2'-azobis(isobutyronitrile), 1,1'-azobis(cyclohexane-1-carbonitrile), azocumene, 2,2'-azobis(2-methylbutyronitrile), 2,2'-azobis-(2,4-dimethylvaleronitrile), 4,4'-azobis(4-cyanovaleric acid), 2-(tert-butylazo)-2-cyanopropane, 2,2'-azobis(2,4,4-trimethylpentane), and 2,2'-azobis(2-methylpropane); inorganic peroxides, such as potassium persulfate and sodium persulfate; vinyl monomers which thermally generate radical species, such as styrene; compounds which generate radical species by light, such as benzoin derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system by electron irradiation, X-ray irradiation, radiation irradiation, or the like. With respect to polymerization initiation methods using such initiators, the methods described in Moad and Solomon "The Chemistry of Free Radical Polymerization", Pergamon, London, 1995, pp. 53–95 may be employed.

In the present invention, the amount of the polymerization initiator used is not particularly limited. In order to produce a polymer with a narrow molecular weight distribution, the amount of radical species generated during polymerization is preferably 1 mole or less, and more preferably 0.5 moles or less, relative to 1 mole of thiocarbonylthio group in the thiocarbonylthio group-containing compound. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light or electron beams. Because of ease of control of polymerization, using a polymerization initiator which causes thermal dissociation, the polymerization reaction is carried out preferably at temperatures which allow the polymerization initiator to have a half-life of 0.5 to 50 hours, more preferably at temperatures which allow the polymerization initiator to have a half-life of 1 to 20 hours, and most preferably at temperatures which allow the polymerization initiator to have a half-life of 5 to 15 hours.

The block copolymer of the present invention is prepared using the solvent, emulsifier, polymerization initiator, etc., as will be described below.

The thiocarbonylthio group-containing block copolymer is treated with a processing agent, as required, so that the thiocarbonylthio groups are converted into mercapto groups or mercaptide groups. The processing agent used in the process is not particularly limited. In view of high yield, preferably, a method is employed in which the thiocarbonylthio group-containing compound is allowed to react with a processing agent composed of a compound selected from the group consisting of bases, acids, and hydrogen-nitrogen bond-containing compounds. Among them, when a base or an acid is used, in the presence of water, thiocarbonylthio groups are converted into mercapto groups by hydrolysis. When a hydrogen-nitrogen bond-containing compound is used, the presence of water is not required, which is preferable.

Examples of bases which may be used as processing agents include, but are not limited to, alkali metal hydroxides, such as sodium hydroxide, potassium hydroxide, and lithium hydroxide; alkaline-earth metal hydroxides, such as calcium hydroxide, magnesium hydroxide, barium hydroxide, and cesium hydroxide; transition metal hydroxides, such as aluminum hydroxide and zinc hydroxide; alkali metal alcoholates, such as sodium methylate, sodium ethylate, sodium phenylate, lithium ethylate, and lithium butylate; alkaline-earth metal alcoholates, such as magnesium methylate and magnesium ethylate; metal hydrides, such as sodium hydride, lithium hydride, calcium hydride, lithium aluminum hydride, and aluminum borohydride; and organometallic reagents, such as hydrosulfite, n-butyllithium, tert-butyllithium, ethylmagnesium bromide, and phenylmagnesium bromide. Furthermore, alkali metals, such as metallic lithium, metallic sodium, and metallic potassium; and alkaline-earth metals, such as metallic magnesium and metallic calcium may also be used. These bases may be used alone or in combination. Among them, in view of availability, cost, and reactivity, preferred are sodium hydroxide, potassium hydroxide, lithium hydroxide, calcium hydroxide, magnesium hydroxide, sodium methylate, sodium ethylate, sodium hydride, lithium hydride, metallic lithium, metallic sodium, and metallic potassium. Because of ease of handling, more preferred are sodium hydroxide, potassium hydroxide, lithium hydroxide, calcium hydroxide, magnesium hydroxide, sodium methylate, and sodium ethylate.

Examples of acids which may be used as processing agents include, but are not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; organic acids, such as p-toluenesulfonic acid, trifluoromethyl sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid; and strong acidic ion exchange resins and weak acidic ion exchange resins. Furthermore, compounds which show acidity in reaction with a small amount of water may also be used. Examples of such compounds include acid anhydrides, such as acetic anhydride, propionic anhydride, trifluoroacetic anhydride, phthalic anhydride, and succinic anhydride; acyl halides; and metal halides, such as titanium tetrachloride, aluminum chloride, and silicon chloride. These acids may be used alone or in combination. Among them, in view of availability, cost, and reactivity, preferred are hydrochloric acid, nitric acid, sulfuric acid, phosphoric acid, aluminum chloride, titanium tetrachloride, chlorosulfonic acid, p-toluenesulfonic acid, trifluoromethyl sulfonic acid, acetic acid, and trifluoroacetic acid.

Examples of hydrogen-nitrogen bond-containing compounds which may be used as processing agents include, but are not limited to, ammonia, hydrazine, primary amine compounds, secondary amine compounds, amide compounds, amine hydrochlorides, hydrogen-nitrogen bond-containing polymers, and hindered amine light stabilizers (HALSs).

Among the hydrogen-nitrogen bond-containing compounds, specific examples of primary amine compounds include, but are not limited to, N-(2-aminoethyl)ethanolamine, 12-aminododecanoic acid, 3-amino-1-propanol, allylamine, isopropylamine, 3,3'-iminobis(propylamine), monoethylamine, 2-ethylhexylamine, 3-(2-ethylhexyloxy)propylamine, 3-ethoxypropylamine, 3-(diethylamino)propylamine, 3-(dibutylamino)propylamine, n-butylamine, tert-butylamine, sec-butylamine, n-propylamine, 3-(methylamino)propylamine, 3-(dimethylamino)propylamine, N-methyl-3,3'-iminobis(propylamine), 3-methoxypropylamine, 2-aminoethanol, ethylenediamine, diethylenetriamine, triethylenetetramine, tetraethylenepentamine, pentaethylenehexamine, N-carboxy-4,4'-methylenebiscyclohexylamine, 1,4-diaminobutane, 1,2-diaminopropane, 1,3-diaminopropane, diaminomaleonitrile, cyclohexylamine, ATU (manufactured by Ajinomoto Co., Inc.), CTU Guanamine (manufactured by Ajinomoto Co., Inc.), thiourea dioxide, 2-hydroxyethylaminopropylamine, hexamethylenediamine, n-hexylamine, monomethylamine, monomethylhydrazine, 3-(lauryloxy)propylamine, anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, aminophenol, p-aminobenzaldehyde, 4-aminobenzonitrile, anthranilic acid, 3-isopropoxyaniline, 4-amino-5-hydroxy-2,7-naphthalenesulfonic acid monosodium salt, 6-amino-4-hydroxy-2-naphthalenesulfonic acid, xylidine, m-xylylenediamine, p-cresidine, dianisidine, 4,4'-diaminostilbene-2,2'-disulfonic acid, 2-amino-5-naphthol-7-sulfonic acid, 1,4-diaminoanthraquinone, 4,4'-diamino-3,3'-diethyldiphenylmethane, 4,4'-diaminobenzanilide, diaminodiphenyl ether, 3,3'-dimethyl-4,4'-diaminodiphenylmethane, sulfanilic acid, tobias acid, 2,4,5-trichloroaniline, o-tolidine, toluidine, toluylenediamine, sodium naphthionate, nitroaniline, m-nitro-p-toluidine, o-chloro-p-toluidine-m-sulfonic acid, phenylhydrazine, phenylenediamine, phenetidine, phenethylamine, benzylamine, benzophenone hydrazine, mesidine, metanilic acid, 2-methyl-4-nitroaniline, leuco-1,4-diaminoanthraquinone, paramine, aminopyridine, 1-(2-aminoethyl)piperazine, N-(3-aminopropyl)morpholine, 1-amino-4-methylpiperazine, bis(aminopropyl)piperazine, benzoguanamine, melamine, o-chloroaniline, 2,5-dichloroaniline, 3,4-dichloroaniline, 3,5-dichloroaniline, 2-amino-4-chlorobenzoic acid, o-chloro-p-nitroaniline, 5-chloro-2-nitroaniline, 2,6-dichloro-4-nitroaniline, 2-(2-chlorophenyl)ethylamine, 3,3$^1$-dichloro-4,4'-diaminodiphenylmethane, 3,3'-dichloro-4,4'-diaminobiphenyl, 2,4-difluoroaniline, o-fluoroaniline, N-β-(aminoethyl)-γ-aminopropyltrimethoxysilane, N-β-(aminoethyl)-γ-aminopropylmethyldimethoxysilane, and γ-aminopropyltriethoxysilane.

Among the hydrogen-nitrogen bond-containing compounds, specific examples of secondary amine compounds include, but are not limited to, N-methylethanolamine, diallylamine, diisopropylamine, diethylamine, diisobutylamine, di-2-ethylhexylamine, iminodiacetic acid, 3,3'-iminodipropionitrile, bis(hydroxyethyl)amine, N-ethylethylenediamine, ethyleneimine, dicyclohexylamine, 1,1-dimethylhydrazine, di-n-butylamine, di-tert-butylamine, dimethylamine, sodium N-methylacetate, N-ethylaniline, diphenylamine, dibenzylamine, 7-anilino-4-hydroxy-2-naphthalenesulfonic acid, N-methylaniline, 2-methyl-4-methoxydiphenylamine, imidazole, 2-methylimidazole, 2-ethyl-4-methylimidazole, 2-phenylimidazole, 2-undecylimidazole, 1,3-di(4-piperidyl)propane, 2,5-dimethylpiperazine, 2,6-dimethylpiperazine, 3,5-dimethylpyrazole, 5,5'-bi-1H-tetrazole, 5-phenyl-1H-tetrazole, 5-methyl-1H-tetrazole, 1,2,3,4-tetrahydroquinoline, (hydroxyethyl) piperazine, pipecoline, 2-(1-piperazinyl)pyrimidine, piperazine, piperidine, pyrrolidine, N-methylpiperazine, 2-methylpiperazine, and morpholine.

Among the hydrogen-nitrogen bond-containing compounds, specific examples of amide compounds include, but are not limited to, 2-acrylamido-2-methylpropanesulfonic acid, dihydrazide adipate, N-isopropylacrylamide, N-t-octylacrylamide, carbohydrazides, guanylthiourea, glycylglycine, N-[3-(dimethylamino)propyl]acrylamide, N-[3-(dimethylamino)propyl]methacrylamide, N,N'-ethylenebis(stearoamide), amide oleate, amide stearate, N,N'-methylenebis(stearoamide), N-(hydroxymethyl) stearoamide, diacetone acrylamide, thioacetoamide, thiocarbohydrazide, thiosemicarbazide, thiourea, dihydrazide dodecanedioate, dihydrazide adipate, dihydrazide sebacate, dihydrazide isophthalate, 1,6-hexamethylenebis (N,N-dimethylsemicarbazide), formamide, methacrylamide, N,N'-methylenebis(acrylamide), N-methylolacrylamide, acetanilide, acetoacet-o-anisidide, acetoacetanilide, acetoacet-m-xylidide, acetoacet-o-chloroanilide, acetoacet-2,5-dimethoxy-4-chloroanilide, acetoacetic toluidide, 1,1,1',1'-tetramethyl-4,4'-(methylenedi-p-phenylene)disemicarbazide, toluene sulfonamide, p-hydroxyphenylacetamide, phthalimide, isocyanuric acid, 3-carbamoyl-2-pyrazine carboxylic acid, imide succinate, 5,5-dimethylhydantoin, 1,3-bis(hydrazinocarboethyl)-5-isopropylhydantoin, hydantoin, phenylpyrazolidone, 3-methyl-5-pyrazolone, 1-methylol-5,5-dimethylhydantoin, 3-(4-chlorophenyl)-1,1-dimethylurea, bromovalerylurea, 2,6-difluorobenzamide, and 2,2,2-trifluoroacetamide.

Among the hydrogen-nitrogen bond-containing compounds, specific examples of amine hydrochlorides include, but are not limited to, acetamidine hydrochloride, 2,2'-azobis-(2-amidinopropane)dihydrochloride, monomethylamine hydrochloride, dimethylamine hydrochloride, monoethylamine hydrochloride, diethylamine hydrochloride, monopropylamine hydrochloride, dipropylamine hydrochloride, monobutylamine hydrochloride, dibutylamine hydrochloride, semicarbazide hydrochloride, guanidine hydrochloride, aminoguanidine hydrochloride, 2-chloroethylamine hydrochloride, cysteamine hydrochloride, and tert-butyl hydrazine monohydrochloride.

Among the hydrogen-nitrogen bond-containing compounds, specific examples of hydrogen-nitrogen bond-containing polymers include, but are not limited to, POLYMENT (manufactured by Nippon Shokubai Co., Ltd.), poly (ethylene imine), amino poly(acryl amide), nylon 6, nylon 66, nylon 610, nylon 612, nylon 11, nylon 12, nylon MXD6, nylon 46, polyamide-imide, polyarylamine, and polyurethane.

Among the hydrogen-nitrogen bond-containing compounds, examples of HALSs include, but are not limited to, Adekasutabu LA-77 (manufactured by Asahi Denka Co., Ltd.), Chimassorb 944LD (manufactured by Ciba Specialty Chemicals), Tinuvin 144 (manufactured by Ciba Specialty Chemicals), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-87 (manufactured by Asahi Denka Co., Ltd.), and Goodrite UV-3034 (manufactured by Goodrich Corporation).

When the thiocarbonylthio group-containing polymer is treated with the processing agent, the amount of the processing agent used is not particularly limited. When an acidic compound or basic compound is used as the processing agent, in view of ease of handling and reactivity, the amount used is preferably 0.01 to 100 parts by weight, more preferably 0.05 to 50 parts by weight, and most preferably 0.1 to 30 parts by weight based on 100 parts by weight of the polymer. When the polymer is treated with an acidic compound or basic compound, in view of stability of the polymer, preferably, neutralization is carried out after treatment. When a hydrogen-nitrogen bond-containing compound is used as the processing agent, because of a high introduction rate of mercapto groups, the amount of the hydrogen-nitrogen bond-containing compound is preferably 0.5 to 1,000 moles, and more preferably 1 to 500 moles, based on 1 mole of thiocarbonylthio group in the polymer. The excess hydrogen-nitrogen bond-containing compound can be recovered and reused. It is also possible to remove the excess processing agent by passing it through a column packed with an adsorbent, such as silica or alumina.

Among the processing agents described above, preferred are hydrogen-nitrogen bond-containing compounds in view of no corrosion of apparatus, the fact that neutralization is not required, and stability of crosslinkable silyl groups. More preferred are ammonia, primary amine compounds with a boiling point of 100° C. or less, and secondary amine compounds with a boiling point of 100° C. or less in view of the fact that the purification step after treatment can be simplified. Most preferred are ammonia, monomethylamine, dimethylamine, monoethylamine, and diethylamine in view of availability.

In the present invention, when the thiocarbonylthio group-containing vinyl polymer is treated with the processing agent, the reaction conditions are not particularly limited. For example, a method in which the polymer is dissolved in an organic solvent, and the processing agent is added thereto; a method in which the processing agent is added to a water-based dispersion or emulsion; or a method in which the processing agent is directly added to the solid or molten polymer itself may be employed. The treatment temperature is not particularly limited. In view of reactivity, the treatment temperature is preferably −50° C. to 300° C., and more preferably −10° C. to 200° C.

By using the processing agent, the block copolymers of the present invention, which have mercapto groups or mercaptide groups, are obtained.

The block copolymers having mercapto groups or mercaptide groups at ends are formed by treatment with the processing agent. If necessary, the block copolymers thus obtained are subjected to a coupling reaction to produce a block copolymer of the desired type. For example, A-B diblock copolymers, each including a polymer block A and a polymer block B linked to the block A, are prepared, and by coupling the A-B diblock copolymers, block copolymers, such as A-B-A block copolymers and (A-B)n block copolymers, are prepared.

Examples of coupling methods used for coupling the block copolymers having mercapto groups or mercaptide groups include, but are not limited to, methods (i) to (xi) for block copolymers having mercapto groups, and methods (xii) to (xv) for block copolymers having mercaptide groups.

Examples of coupling methods for block copolymers having mercapto groups include (i) a method in which disulfide bonds are formed between block copolymers in the presence of an oxidizing agent, such as oxygen, lead dioxide, or calcium dioxide, and thereby the block copolymers are coupled; (ii) a method in which a compound having at least two isocyanato groups in each molecule is allowed to react with block copolymers, and thereby the block copolymers are coupled via thiourethane bonds (—NHCOS—); (iii) a method in which a compound having at least two isothiocyanato groups in each molecule is allowed to react with block copolymers, and thereby the block copolymers are coupled via dithiourethane bonds (—NHCSS—); (iv) a method in which a compound having at least two unsaturated bonds in each molecule is added to block copolymers, and thereby the block copolymers are coupled; (v) a method in which dehydrocondensation is performed between a polyvalent carboxylic acid and block copolymers, and thereby the block copolymers are coupled via thioester bonds; (vi) a method in which transesterification is performed between a polyvalent carboxylate ester and block copolymers, and thereby the block copolymers are coupled via thioester bonds; (vii) a method in which esterification is performed between a polyvalent carboxylic anhydride and block copolymers, and thereby the block copolymers are coupled via thioester bonds; (viii) a method in which acylation is performed between a polyvalent acyl halide and block copolymers, and thereby the block copolymers are coupled via thioester bonds; (ix) a method in which block copolymers are coupled by transesterification between a carbonate compound and the block copolymers; (x) a method in which a ketone is allowed to react with block copolymers to form thioketal bonds, and thereby the block copolymers are coupled; and (xi) a method in which block copolymers are coupled by dehydrocondensation between a compound having at least two hydroxyl groups in each molecule and the block copolymers. Examples of coupling methods for block copolymers having mercaptide groups include (xii) a method in which a compound having at least two halogen atoms in each molecule is allowed to react with block copolymers to form sulfide bonds (Williamson reaction), and thereby the block copolymers are coupled; (xiii) a method in which block copolymers are coupled by neutralization between a polyvalent carboxylic acid and the block copolymers; (xiv) a method in which block copolymers are coupled by a reaction between a polyvalent carboxylic acid halide and the block copolymers; and (xv) a method in which disulfide bonds are formed between block copolymers in the presence of an oxidizing agent, and thereby the block copolymers are coupled.

In addition, it is also possible to use compounds having different functional groups in each molecule. Examples of such compounds include, but are not limited to, ketones having an isocyanato group in each molecule, compounds having an isocyanato group and an alkenyl group in each molecule, compounds having an isocyanato group and a halogen atom in each molecule, compounds having a hydroxyl group and a mercapto group in each molecule, compounds having an aromatic isocyanato group and an aliphatic isocyanato group in each molecule, compounds having a carboxyl group and a halogen atom in each molecule, compounds having a hydroxyl group and a halogen atom in each molecule, compounds having a mercapto group and a halogen atom in each molecule, compounds having a halogen atom and an alkenyl group in each molecule, compounds having an alkenyl group and a mercapto group in each molecule, and compounds having an isocyanato group and an ethinyl group in each molecule.

Among these methods, in view of ease of reaction and coupling efficiency, methods (i), (iii), (xii), and (xv) are preferred.

Among the coupling methods for block copolymers having mercapto groups, when method (i), in which disulfide bonds are formed between block copolymers in the presence of an oxidizing agent, is employed, examples of oxidizing agents which may be used include, but are not limited to, chlorates, such as sodium chlorate, potassium chlorate, ammonium chlorate, barium chlorate, and calcium chlorate; perchlorates, such as sodium perchlorate, potassium perchlorate, and ammonium perchlorate; inorganic peroxides, such as lithium peroxide, sodium peroxide, potassium peroxide, rubidium peroxide, cesium peroxide, magnesium peroxide, calcium peroxide, strontium peroxide, and barium peroxide; chlorites, such as sodium chlorite, potassium chlorite, copper chlorite, and lead chlorite; bromates, such as sodium bromate, potassium bromate, magnesium bromate, and barium bromate; nitrates, such as sodium nitrate, potassium nitrate, ammonium nitrate, barium nitrate, and silver nitrate; iodates, such as sodium iodate, potassium iodate, calcium iodate, and zinc iodate; permanganates, such as potassium permanganate, sodium permanganate, and ammonium permanganate; bichromates, such as sodium bichromate, potassium bichromate, and ammonium bichromate; periodates, such as sodium periodate; periodic acids, such as metaperiodic acid; chromium oxides, such as chromic anhydride (chromium trioxide); lead oxides, such as lead dioxide; iodine oxides, such as diiodine pentoxide; nitrites, such as sodium nitrite and potassium nitrite; hypochlorites, such as calcium hypochlorite; chloroisocyanuric acids, such as trichloroisocyanuric acid; peroxodisulfates, such as ammonium peroxodisulfate; peroxoborates, such as ammonium peroxoborate; perchloric acid; hydrogen peroxide; nitric acid; halides, such as chlorine fluoride, bromine trifluoride, bromine pentafluoride, and iodine pentafluoride; iodine; and oxygen. These may be used alone or in combination as long as no danger is involved. It is also possible to use a compound which generates hydrogen peroxide in reaction with water or moisture in air, such as calcium dioxide. Among them, because of ease of reaction and high efficiency, preferred are sodium chlorate, sodium perchlorate, sodium peroxide, sodium chlorite, lead dioxide, hydrogen peroxide, calcium dioxide, and oxygen.

When method (ii), in which a compound having at least two isocyanato groups in each molecule is allowed to react with block copolymers, and thereby coupling of the block copolymers is performed via thiourethane bonds (—NHCOS—), is employed, examples of the compound having at least two isocyanato groups in each molecule which may be used include, but are not limited to, diisocyanate compounds, such as hexamethylene diisocyanate, 2,4-tolylene diisocyanate, diphenylmethane diisocyanate, isophorone diisocyanate, xylylene diisocyanate, methylenebis(cyclohexylisocyanate), bis(isocyanatemethyl)cyclohexane, 1,5-naphthylene diisocyanate, ethylene diisocyanate, methylene diisocyanate, propylene diisocyanate, and tetramethylene diisocyanate; triisocyanate compounds, such as 1,6,11-undecane triisocyanate and triphenylmethane triisocyanate; polyvalent isocyanate compounds formed by reaction of these compounds with polyhydric alcohols; isocyanurate-modifications of these compounds; and polyvalent isocyanate compounds formed by reaction of these compounds with polyvalent amine compounds. These may be used alone or in combination. Among them, in view of availability and reactivity, preferred are hexamethylene diisocyanate, 2,4-tolylene diisocyanate, diphenylmethane diisocyanate, isophorone diisocyanate, xylylene diisocyanate, methylenebis(cyclohexylisocyanate), and bis(isocyanatemethyl)cyclohexane.

In the reaction described above, a catalyst (urethane formation catalyst) may be used as necessary. For example, the catalysts cited in Polyurethanes: Chemistry and Technology, Part I, Table 30, Chapter 4, Saunders and Frisch, Interscience Publishers, New York, 1963 may be used, but usable catalysts are not limited thereto. As the urethane formation reaction catalysts which may be used in the reaction described above, the following catalysts are preferred because of their high activity: tin catalysts, such as tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltindiacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate; and tertiary amine compounds and their analogues, such as triethylamine, triphenylamine, trimethylamine, N,N-dimethylaniline, and pyridine.

The amount of the catalyst added in the reaction is not particularly limited, but is preferably 0.0001 to 3 parts by weight, more preferably 0.001 to 0.5 parts by weight, and most preferably 0.003 to 0.1 parts by weight, based on 100 parts by weight of the block copolymer having mercapto groups or mercaptide groups. If the amount is less than 0.0001 parts by weight, sufficient reactivity may not be obtained. If the amount exceeds 3 parts by weight, the properties of the resultant block copolymer, such as heat resistance, weatherability, and hydrolysis resistance, may be degraded.

In method (iii) in which a compound having at least two isothiocyanato groups in each molecule is allowed to react with block copolymers, and thereby the block copolymers are coupled via dithiourethane bonds (—NHCSS—), the compound having at least two isothiocyanato groups in each molecule used is not particularly limited. Examples thereof include compounds obtained by replacing the isocyanato groups of the compound having at least two isocyanato groups in each molecule described above with isothiocyanato groups.

In method (iv) in which a compound having at least two unsaturated bonds in each molecule is added to block copolymers, and thereby the block copolymers coupled, examples of compounds having at least two unsaturated bonds in each molecule which may be used include, but are not limited to, butadiene, isoprene, chloroprene, 1,4-heptadiene, 1,5-hexadiene, 1,6-heptadiene, 1,7-octadiene, divinyl ether, diallyl ether, vinyl acrylate, vinyl methacrylate, allyl acrylate, allyl methacrylate, 1,2-divinylbenzene, 1,4-divinylbenzene, 1,3,5-trivinylbenzene, bisphenol A divinyl ether, bisphenol A diallyl ether, trimethylolpropane divinyl ether, trimethylolpropane trivinyl ether, trimethylolpropane diallyl ether, trimethylolpropane triallyl ether, acrylate of alkyl-modified dipentaerythritol, ethylene oxide-modified bisphenol A diacrylate, acrylate of ε-caprolactone-modified dipentaerythritol, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol diacrylate, tripropylene glycol diacrylate, trimethylolpropane ethylene oxide-modified triacrylate, trimethylolpropane triacrylate, neopentyl glycol diacrylate, diacrylate of neopentyl glycol hydroxypivalate, 1,9-nonanediol diacrylate, 1,4-butanediol diacrylate, 2-propenoic acid [2-[1,1-dimethyl-2-[(1-oxo-2-propenyl)oxy]ethyl]-5-ethyl-1,3-dioxane-5-yl]methyl ester, 1,6-hexanediol diacrylate, pentaerythritol triacrylate, ethylene glycol dimethacrylate, tetraethylene glycol dimethacrylate, triethylene glycol dimethacrylate, 1,3-butylene glycol dimethacrylate, trimethylolpropane trimethacrylate, pentaerythritol divinyl ether, pentaerythritol trivinyl ether, pentaerythritol diallyl ether, pentaerythritol triallyl ether, 1,4-butanediol divinyl ether, 1,4-butanediol diallyl ether, 1,5-pentanediol divinyl ether, 1,5-pentanediol diallyl ether, 1,6-hexanediol divinyl ether, 1,6-hexanediol diallyl ether, diethylene glycol divinyl ether, diethylene glycol diallyl ether, tripropylene glycol divinyl ether, tripropylene glycol diallyl ether, tetraethylene glycol divinyl ether, tetraethylene glycol diallyl ether, poly(ethylene oxide) divinyl ether, poly(ethylene oxide) diallyl ether, poly(propylene oxide) divinyl ether, poly(propylene oxide) diallyl ether, neopentyl glycol divinyl ether, neopentyl glycol diallyl ether, divinyl trimellitate, trivinyl trimellitate, diallyl trimellitate, triallyl trimellitate, divinyl succinate, diallyl succinate, divinyl phthalate, diallyl phthalate, divinyl maleate, diallyl maleate, divinyl terephthalate, diallyl terephthalate, divinyl carbonate, diallyl carbonate, 1,3,5-triacryloylhexahydro-1,3,5-triazine, triallyl isocyanurate, triallyl cyanurate, trimethallyl isocyanurate, furan, cyclopentadiene, dicyclopentadiene, and a maleimide compound represented by general formula (5):

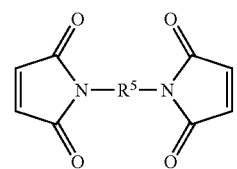

(5)

(wherein $R^5$ is a divalent organic group of 1 or more carbon atoms). In view of availability, preferably, $R^5$ has 1 to 20 carbon atoms. These compounds may be used alone or in combination.

In method (v) in which dehydrocondensation is performed between a polyvalent carboxylic acid and block copolymers, and thereby the block copolymers are coupled via thioester bonds, examples of polyvalent carboxylic acids which may be used include, but are not limited to, adipic acid, itaconic acid, iminodiacetic acid, ethylenediaminetetraacetic acid, glutaric acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, 1,2-cyclohexanediaminetetraacetic acid, brassylic acid, malonic acid, phthalic acid, isophthalic acid, terephthalic acid, naphthalenedicarboxylic acid, 5-hydroxyisophthalic acid, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, imidazole-4,5-dicarboxylic acid, chelidamic acid, 2,3-pyrazinedicarboxylic acid, folic acid, citric acid, succinic acid, fumaric acid, malic acid, glutamic acid, aspartic acid, cystine, chlorendic acid, and trimellitic acid. These may be used alone or in combination. When block copolymers are allowed to react with these polyvalent carboxylic acids, any esterification catalyst commonly used may be used. By removing water produced during reaction, the reaction can be carried out effectively. For example, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

In method (vi) in which transesterification is performed between a polyvalent carboxylate ester and block copolymers, and thereby the block copolymers are coupled, as the polyvalent carboxylate ester, esters of the polyvalent carboxylic acids described above may be used. Examples of carboxylate esters include, but are not limited to, methyl esters, ethyl esters, n-propyl esters, isopropyl esters, n-butyl esters, isobutyl esters, sec-butyl esters, tert-butyl esters, decyl esters, isodecyl esters, lauryl esters, vinyl esters, allyl esters, phenyl esters, benzyl esters, naphthyl esters, (4-hydroxyphenyl)esters, (4-methoxyphenyl)esters, and (4-vinylphenyl)esters. These esters may be used alone or in combination. When block copolymers are allowed to react with the polyvalent carboxylate esters, any transesterification catalyst commonly used may be used. In order to carry out the reaction efficiently, by-product alcohol is preferably removed by distillation under normal or reduced pressure.

In method (vii) in which esterification is performed between a polyvalent carboxylic anhydride and block copolymers, and thereby the block copolymers are coupled, as the polyvalent carboxylic anhydride, anhydrides of the polyvalent carboxylic acids described above may be used, but the anhydride which may be used is not limited thereto. These polyvalent carboxylic anhydrides may be used alone or in combination. In the reaction, any transesterification catalyst commonly used may be used. In this method, by removing water produced during reaction, the reaction can also be carried out effectively. As in the case described above, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

In method (viii) in which dehydrohalogenation (acylation) is performed between a polyvalent carboxylic acid halide and block copolymers, and thereby the block copolymers are coupled, as the polyvalent acyl halide, halides of the polyvalent carboxylic acids described above may be used. Specific examples of polyvalent acyl halides include, but are not limited to, chlorinated compounds, such as succinyl dichloride, adypinyl dichloride, itaconyl dichloride, oxalyl dichloride, tartaryl dichloride, malonyl dichloride, phthalyl dichloride, isophthalyl dichloride, terephthalyl dichloride, fumaryl dichloride, maleyl dichloride; compounds formed by replacing the chlorine atoms in the above-mentioned chlorinated compounds by bromine atoms; and compounds formed by replacing the chlorine atoms in the above-mentioned chlorinated compounds by iodine atoms. Among them, in view of availability and reactivity, preferred are chlorinated compounds, such as succinyl dichloride, malonyl dichloride, and fumaryl dichloride. These may be used alone or in combination. After the reaction, preferably, acids present in the system are removed by neutralization or distillation under reduced pressure. If the acids are not removed, corrosion may occur.

In method (ix) in which block copolymers are coupled by transesterification between a carbonate compound and the block copolymers, examples of carbonate compounds which may be used include, but are not limited to, dimethyl carbonate, diethyl carbonate, di-n-propyl carbonate, diisopropyl carbonate, di-n-butyl carbonate, diisobutyl carbonate, di-sec-butyl carbonate, di-tert-butyl carbonate, divinyl carbonate, diallyl carbonate, diphenyl carbonate, ethylene carbonate, and propylene carbonate. These may be used alone or in combination. In the reaction between block copolymers and the carbonate compounds, any transesterification catalyst commonly used may be used. In order to carry out the reaction efficiently, by-product alcohol is preferably removed by distillation under normal or reduced pressure.

In method (x) in which a ketone is allowed to react with block copolymers to form thioketal bonds, and thereby the block copolymers are coupled, examples of ketones which may be used include, but are not limited to, acetylacetone, acetone, isophorone, diisobutyl ketone, diisopropyl ketone, cyclohexanone, cyclopentanone, 1,3-dihydroxyacetone, 1,3-dihydroxyacetone dimethyl ether, 4,4-dimethoxy-2-butanone, diacetone acrylamide, diacetone alcohol, 4-hydroxy-2-butanone, methyl isobutyl ketone, methyl isopropyl ketone, methyl ethyl ketone, methylcyclohexanone, 3-methylpentenone, anthraquinone, chloranil, 1,4-diaminoanthraquinone, 1,4-dihydroxyanthraquinone, 4,4'-dimethoxybenzophenone, 2,3,4-trihydroxybenzophenone, 1,4-naphthoquinone, quinone, propiophenone, benzil, o-benzoylbenzoic acid, methyl o-benzoylbenzoate, benzoin, benzoin isopropyl ether, benzoin isobutyl ether, benzoin ethyl ether, benzophenone, 3,3',4,4'-benzophenonetetracarboxylic dianhydride, kojic acid, diketene, methyl 4-chloroacetoacetate, chloroacetophenone, 2,3-dichloro-5,6-dicyano-1,4-benzoquinone, 2,3-dichloro-1,4-naphthoquinone, and hexafluoroacetone. These may be used alone or in combination. In view of reactivity, the reaction is preferably carried out in acidic conditions. The acid used for creating the acidic conditions is not particularly limited and any acid commonly used may be used. In view of stability and corrosion resistance of the product, the acid is preferably neutralized after the reaction.

In method (xi) in which block copolymers are coupled by dehydrocondensation between a compound having at least two hydroxyl groups in each molecule and the block copolymers, examples of compounds having at least two hydroxyl groups in each molecule which may be used include, but are not limited to, 3,6-dimethyl-4-octyne-3,6-diol, 2,4,7,9-tetramethyl-5-decyne-4,7-diol, 2,5-dimethyl-3-hexyne-2,5-diol, 2,5-dimethyl-2,5-hexanediol, isoprene glycol, diisopropanolamine, triisopropanolamine, diethanolamine, triethanolamine, ethylene glycol, diethylene glycol, triethylene glycol, 2-ethyl-1,3-hexanediol, sodium gluconate, glycerol α-monochlorohydrin, 1,4-cyclohexanediol, 1,3-dihydroxyacetone, 1,4-dihydroxy-1,4-butanedisulfonic acid disodium salt, tartaric acid, diisopropyl tartrate, 1-thioglycerol, thiodiglycol, trimethylolethane, trimethylolpropane, trimethylolpropane monoallyl ether, neopentyl glycol, 1,3-butanediol, 1,4-butanediol, 2-butyl-2-ethyl-1,3-propanediol, propylene glycol, dipropylene glycol, tripropylene glycol, 1,6-hexanediol, 1,2,6-hexanetriol, hexylene glycol, pentaerythritol, 1,5-pentanediol, polyethylene glycol, polytetramethylene ether glycol, polypropylene glycol, 3-methyl-1,5-pentanediol, catechol, 1,4-dihydroxyanthraquinone, 1,4-dihydroxynaphthalene, 2,3,4-trihydroxybenzophenone, 2,3,5-trimethylhydroquinone, hydroquinone, bis(2-hydroxyethyl)terephthalate, bis(4-hydroxyphenyl)sulfone, bisphenol A, p-hydroxyphenethyl alcohol, 4-tert-butylcatechol, 2-tert-butylhydroquinone, protocatechuic acid, phloroglucinol, lauryl gallate, resorcin, leuco-1,4-dihydroxyanthraquinone, 1,1'-bi-2-naphthol, kojic acid, and citrazinic acid. These may be used alone or in combination. When block copolymers are allowed to react with the compound having at least two hydroxyl groups in each molecule, any esterification catalyst commonly used may be used. In this method, by removing water produced during reaction, the reaction can be also carried out effectively. As in the case described above, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

Among the coupling methods for coupling block copolymers having mercaptide groups, in method (xii) in which a compound having at least two halogen atoms in each molecule is allowed to react with block copolymers to form sulfide bonds (Williamson reaction), and thereby the block copolymers are coupled, examples of compounds having at least two halogen atoms in each molecule which may be used include, but are not limited to, methylene chloride, 1,1,1-trichloroethane, 1,2-dichloroethane, chloroform, trichloroethylene, tetrachloroethylene, 2,5-dichloroaniline, 3,4-dichloroaniline, 3,5-dichloroaniline, 2,4-dichlorobenzoic acid, 2,3-dichlorotoluene, 2,4-dichlorotoluene, 2,6-dichlorotoluene, 3,4-dichlorotoluene, 2,6-dichloro-4-nitroaniline, 1,4-dichloro-2-nitrobenzene, 2,4-dichloro-1-nitrobenzene, o-chlorobenzyl chloride, p-chlorobenzyl chloride, 2,6-dichlorobenzyl chloride, 3,4-dichlorobenzyl chloride, 2,3-dichlorobenzaldehyde, 2,4-dichlorobenzaldehyde, 2,6-dichlorobenzaldehyde, o-dichlorobenzene, m-dichlorobenzene, p-dichlorobenzene, 1,3,5-trichlorobenzene, 2,3-dichlorobenzoyl chloride, 2,4-dichlorobenzoyl chloride, 2,6-dichlorobenzoyl chloride, carbon tetrachloride, 3,3'-dichloro-4,4'-diaminodiphenylmethane, 3,3'-dichloro-4,4'-diaminobiphenyl, 2,3-dichloro-5,6-dicyano-1,4-benzoquinone, 2,3-dichloro-1,4-naphthoquinone, 2,6-dichlorobenzal chloride, 2,6-dichlorobenzonitrile, octabromodiphenyl ether, 1,1,2,2-tetrabromoethane, 1,2-dibromo-4-(1,2-dibromoethyl)cyclohexane, 1,4-dibromobutane, 1,3-dibromopropane, 2,3-dibromo-1-propanol, 1,5-dibromopentane, decabromodiphenyl ether, tetradecabromo-p-diphenoxybenzene, tetrabromocyclooctane, tetramethylene chlorobromide, 2-(2-hydroxyethoxy)ethyl-2-hydroxypropyltetrabromophthalate, 1-bromo-2-chloroethane, 1-bromo-3-chloropropane, 1-bromo-6-chlorohexane, bromochloromethane, hexabromobenzene, pentamethylene chlorobromide, methylene dibromide, dichloropentafluoropropane, 2,4-difluoroaniline, 2,6-difluorobenzonitrile, 2,6-difluorobenzamide, 2,2,3,3-tetrafluoropropanol, 2,2,2-trifluoroacetamide, trifluoroacetaldehyde hydrate, trifluoroethanol, trifluoroacetic acid, trifluoroacetic anhydride, trifluoroacetic acid ethyl ester, trifluoromethanesulfonic acid, trifluoromethanesulfonic acid anhydride, lithium trifluoromethanesulfonate, 2-(trifluoromethyl)benzaldehyde, 4-(trifluoromethyl)benzaldehyde, 2-(trifluoromethyl)benzoyl chloride, perfluorooctyl iodide, 2-perfluoroalkylethanol, perfluoroalkylethyl acrylate, perfluoropropyl vinyl ether, perfluoropolyalkenyl vinyl ether, 1,3-bis(trifluoromethyl)benzene, 1,4-bis(trifluoromethyl)benzene, 2,2-bis(4-hydroxyphenyl)hexafluoropropane, vinylidene fluoride, hexafluoroacetone trihydrate, hexafluoro-2-propanol, hexafluoropropylene, hexafluoropropylene oxide, 1,2-diiodoethane, and 1,4-diiodobenzene. These may be used alone or in combination. When transparency is required, produced salts are preferably removed by filtration or water washing.

In method (xiii) in which block copolymers are coupled by a reaction between a polyvalent carboxylic acid and the block copolymers, as the polyvalent carboxylic acid, the same polyvalent carboxylic acids as those used in method (v) may be used. The usable polyvalent carboxylic acids are not limited thereto. These may be used alone or in combination. in view of the durability of the resultant polymer, by-produced bases are preferably neutralized during or after the reaction.

In method (xiv) in which block copolymers are coupled by a reaction between a polyvalent acyl halide and the block copolymers, as the polyvalent acyl halide, the same compounds as those used in method (viii) may be used.

In method (xv) in which disulfide bonds are formed between block copolymers, and thereby the block copolymers are coupled, as the oxidizing agent, the same compounds as those used in method (i) may be used.

When the block copolymers are coupled via the mercapto groups or mercaptide groups, it is also possible to use a compound having the groups contained in the compounds described above. For example, compounds having carboxyl groups (method (v) and method (xiii)) and hydroxyl groups (method (xi)), such as salicylic acid and lactic acid; and compounds having halogen atoms (method (xii)) and carboxyl groups (method (v) and method (xiii), such as 4-chlorobenzoic acid may be used to perform the coupling reactions.

In order to carry out the coupling reactions efficiently, organic solvents may be used. Examples of organic solvents which may be used in the present invention include, but are not limited to, hydrocarbon solvents, such as heptane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; ether solvents, such as tetrahydrofuran, diethyl ether, di-n-butyl ether, dioxane, ethylene glycol dimethyl ether, and ethylene glycol diethyl ether; and aromatic petroleum solvents, such as toluene, xylene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The reaction temperature is not particularly limited. In view of reactivity, the reaction temperature is preferably in the range of 0° C. to 200° C.

As the thermoplastic resin, which is contained in the thermoplastic resin composition of the present invention, various thermoplastic resins which are conventionally used may be used. Examples of thermoplastic resins include, but are not limited to, ionomer resins, such as SURLYN (manufactured by E. I. Du Pont de Nemours and Company), and HIMILAN (manufactured by Du Pont-Mitsui Polychemicals Co., Ltd.); polyacrylic acid hydrazide, isobutylene-maleic anhydride copolymers, acrylonitrile-styrene-acrylic rubber copolymers (AAS), acrylonitrile-EPDM-styrene copolymers (AES), acrylonitrile-styrene copolymers (AS), acrylonitrile-butadiene-styrene copolymers (ABS), and ABS-vinyl chloride self-extinguishing resins, such as Kaneka Enplex (manufactured by Kaneka Corporation); ABS heat-resistant resins, such as Kaneka MUH (manufactured by Kaneka Corporation); acrylonitrile-chlorinated polyethylene-styrene resins (ACS), methyl methacrylate-butadiene-styrene copolymers (MBS), ethylene-vinyl chloride copolymers, ethylene-vinyl acetate copolymers (EVA), modified ethylene-vinyl acetate copolymers, chlorinated ethylene-vinyl acetate copolymers, ethylene-vinyl acetate-vinyl chloride graft copolymers, ethylene-vinyl alcohol copolymers (EVOH), chlorinated poly(vinyl chloride), chlorinated polyethylene, chlorinated polypropylene, carboxyvinyl polymers, ketone resins, norbornene resins, polytetrafluoroethylene (PTFE), ethylene fluoride-propylene copolymers, tetrafluoroethylene-perfluoroalkyl vinyl ether copolymers (PFA), polychlorotrifluoroethylene, ethylene-tetrafluoroethylene copolymers, low-melting-point ethylene-tetrafluoroethylene copolymers, poly(vinylidene fluoride) (PVDF), poly (vinyl fluoride), polyacetal, polyamide 6, polyamide 66, polyamide 610, polyamide 612, polyamide 11, polyamide 12, copolymerized polyamides, polyamide MXD6, polyamide 46, methoxymethylated polyamides, polyamideimides, polyarylates, thermoplastic polyimides, polyether imides, polyether ether ketones, polyethylene, poly(ethylene oxide), poly(ethylene terephthalate) (PET), poly(ethylene naphthalate), poly(vinylidene chloride), poly(vinyl chloride) (PVC), polycarbonate, poly(vinyl acetate), polystyrene, polysulfone, poly(ether sulfone), poly(amine sulfone), polyparavinylphenol, polyparamethylstyrene, polyallylamine, poly(vinyl alcohol) (PVA), polyvinyl ether, poly(vinyl butyral) (PVB), poly(vinyl formal) (PVF), polyphenylene ether, modified polyphenylene ether, poly(phenylene sulfide), polybutadiene, poly(butylene terephthalate) (PBT), polypropylene, polymethylpentene, poly(methyl methacrylate), and various types of liquid crystal polymers. These may be used alone or in combination. Among them, because of the excellence in heat resistance, weatherability, and oil resistance, at least one resin selected from the group consisting of poly(vinyl chloride), poly(methyl methacrylate), acrylonitrile-styrene copolymers, acrylonitrile-butadiene-styrene copolymers, polycarbonate, polyester resins, and polyamide resins is preferable.

An elastomer composition of the present invention contains the block copolymer and a synthetic rubber. Examples of such a synthetic rubber include, but are not limited to, styrene-butadiene rubber (SBR), butadiene rubber (BR), isoprene rubber (IR), ethylene-propylene copolymer rubber (EPM), ethylene-propylene-diene copolymer rubber (EPDM), acrylonitrile-butadiene copolymer rubber (NBR), chloroprene rubber, butyl rubber (IIR), urethane rubber, silicone rubber, polysulfide rubber, hydrogenated nitrile rubber, fluororubber, ethylene tetrafluoride-propylene rubber, ethylene tetrafluoride-propylene-vinylidene fluoride rubber, acrylic rubber (ACM), chlorosufonated polyethylene rubber, epichlorohydrin rubber (CO), ethylene-acrylic rubber, norbornene rubber, styrene-based thermoplastic elastomers (SBC), olefinic thermoplastic elastomers (TPO), urethane-based thermoplastic elastomers (TPU), polyester-based thermoplastic elastomers (TPEE), polyamide-based thermoplastic elastomers (TPAE), 1,2-polybutadiene-based thermoplastic elastomers, vinyl chloride-based thermoplastic elastomers (TPVC), and fluorine-containing thermoplastic elastomers. These may be used alone or in combination.

Each of the thermoplastic resin composition and the elastomer composition of the present invention may contain both a thermoplastic resin and a synthetic rubber besides the block copolymer. The composition may be dynamically crosslinked by a method which is commonly used.

In the thermoplastic resin composition and elastomer composition of the present invention, in order to adjust various physical properties, at least one type of additives may be compounded as necessary, besides the thermoplastic resin, the elastomer resin, and the block copolymer. As the additive, at least one material selected from the group consisting of plasticizers, thixotropy-improving agents, heat resistance-improving agents, stabilizers, antioxidants, ultraviolet absorbers, hindered amine light stabilizers (HALSs), antistatic agents, fire retardants, colorants, blowing agents, lubricants, mildewproofing agents, nucleating additives, vulcanization accelerators, aging resisters, vulcanizing agents, antiscorching agents, peptizers, tackifiers, latex coagulants, processing aids, inorganic fillers, and natural rubber may be used. Optimum additives may be selected depending on the types and compositions of the thermoplastic resins and the elastomers, the compositions of the block copolymers, the applications of the compositions, etc.

The block copolymers of the present invention have heat resistance, weatherability, oil resistance, and flame retardancy which are originally exhibited by the acrylonitrile and methacrylonitrile polymers, and furthermore are excellent in low-temperature resistance. Consequently, the block copolymers can be used in various applications, such as films, sheets, tapes, hoses, tubes, gaskets, packings, grips, various molded objects, sealants, damping materials, pressure-sensitive adhesives, adhesives, resin modifiers, coating materials, potting materials, textiles, materials for thermoplastic resin compositions, and materials for elastomers.

The thermoplastic resin compositions of the present invention contain the block copolymers and thermoplastic resins. The elastomer compositions of the present invention contain the block copolymers and synthetic rubbers. These compositions can be used widely in various applications, such as films, sheets, tapes, hoses, tubes, gaskets, packings, grips, containers, various molded objects, sealants, damping materials, pressure-sensitive adhesives, adhesives, coating materials, potting materials, and textiles.

BEST MODE FOR CARRYING OUT THE INVENTION

While the present invention will be described based on the examples below, it is to be understood that the invention is not limited thereto.

In the examples below, the weight-average molecular weight (Mw), number-average molecular weight (Mn), and molecular weight distribution (Mw/Mn) were determined by gel permeation chromatography (GPC). In the GPC, chloroform, tetrahydrofuran, or dimethylformamide was used as an eluent, and a polystyrene gel column was used. The analysis was carried out on the basis of a polystyrene standard sample.

EXAMPLE 1

Synthesis of Mercapto Group-terminated acrylonitrile-n-butyl acrylate diblock copolymer Into a 2 L reactor equipped with an agitator, a thermometer, a nitrogen gas inlet tube, a dropping funnel, and a reflux condenser, was placed 490 g of distilled water and 0.56 g of sodium dodecyl sulfate, and the reactor was nitrogen-purged while the reaction mixture was being stirred at 80° C. A mixed solution of 8.8 g of acrylonitrile and 1.09 g of a compound represented by formula (6):

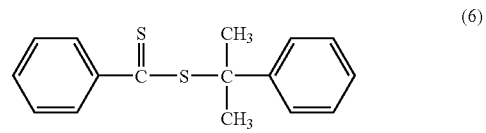

was added into the reactor, and stirring was performed at 80° C. for 20 minutes. Next, 0.93 g of 4,4'-azobis(4-cyanovaleric acid) together with 25 g of distilled water was added into the reactor. Stirring was performed at 80° C. for 30 minutes, and then 45.0 g of acrylonitrile was dripped from the dropping funnel for over 1 hour. After dripping was completed, stirring was performed at 80° C. for 5 hours, and sampling was performed. Production of polyacrylonitrile (Mw=13,700, Mn=10,300, and Mw/Mn=1.33) was confirmed by gel permeation chromatography analysis.

Next, 20.0 g of n-butyl acrylate was added into the reactor, and 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 2 hours. After dripping was completed, the mixture was stirred at 80° C. for 5 hours and then cooled to room temperature. A salting-out method was performed, followed by filtration, washing, and drying. Thereby, production of an acrylonitrile-n-butyl acrylate diblock copolymer (Mw=48,600, Mn=34,500, and Mw/Mn=1.41) was confirmed.

The diblock copolymer (50 g) was dissolved in 200 mL of toluene, and 15 g of monoethylamine was added thereinto, followed by stirring at 30° C. for 8 hours. $^1$H NMR analysis and IR analysis confirmed that the thiocarbonylthio groups at ends were quantitatively converted into mercapto groups. The toluene solution was washed with water and then poured into methanol to precipitate and isolate the block copolymer.

EXAMPLE 2

Synthesis of Mercapto Group-terminated Methacrylonitrile-n-butyl Acrylate Diblock Copolymer Into a 2 L reactor equipped with an agitator, a thermometer, a nitrogen gas inlet tube, a dropping funnel, and a reflux condenser, was placed 490 g of distilled water and 0.55 g of sodium dodecyl sulfate, and the reactor was nitrogen-purged while the reaction mixture was being stirred at 80° C. A mixed solution of 11.3 g of methacrylonitrile and 1.08 g of a compound represented by formula (6):

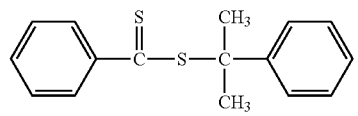

(6)

was added into the reactor, and stirring was performed at 80° C. for 20 minutes. Next, 0.93 g of 4,4'-azobis(4-cyanovaleric acid) together with 25 g of distilled water was added into the reactor. Stirring was performed at 80° C. for 30 minutes, and then 57.7 g of methacrylonitrile was dripped from the dropping funnel for over 1 hour. After dripping was completed, stirring was performed at 80° C. for 5 hours, and sampling was performed. Production of polymethacrylonitrile (Mw=16,400, Mn=13,000, and Mw/Mn=1.26) was confirmed by gel permeation chromatography analysis.

Next, 20.0 g of n-butyl acrylate was added into the reactor, and 0.36 g of 4,4'-azobis(4-cyanovaleric acid) together with 13 g of distilled water was further added thereinto. Stirring was performed at 80° C. for 1 hour, and then 80.0 g of n-butyl acrylate was dripped from the dropping funnel for over 2 hours. After dripping was completed, the mixture was stirred at 80° C. for 4 hours and then cooled to room temperature. A salting-out method was performed, followed by filtration, washing, and drying. Thereby, production of a methacrylonitrile-n-butyl acrylate diblock copolymer (Mw=49,900, Mn=36,300, and Mw/Mn=1.37) was confirmed.

The diblock copolymer (70 g) thus obtained was dissolved in 300 mL of toluene, and 18 g of monoethylamine was added thereinto, followed by stirring at 30° C. for 16 hours. $^1$H NMR analysis and IR confirmed that the thiocarbonylthio groups at ends were quantitatively converted into mercapto groups. The toluene solution was washed with water and then poured into methanol to precipitate and isolate the block copolymer.

EXAMPLE 3

Synthesis of Mercapto Group-terminated Acrylonitrile-(n-butyl Acrylate/ethyl Acrylate) Diblock Copolymer Into a 300 mL reactor equipped with an agitator, a thermometer, a nitrogen gas inlet tube, a dropping funnel, and a reflux condenser, was placed 110 mg of sodium dodecyl sulfate and 100 g of distilled water, and the reactor was nitrogen-purged while the reaction mixture was being stirred at 80° C. A compound (217 mg) represented by

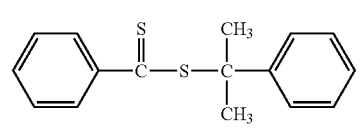

(6)

which was dissolved in 1.6 g of acrylonitrile, was added into the reactor, and after 20 minutes, 185 mg of 4,4'-azobis(4-cyanovaleric acid) together with 5 g of distilled water was added into the reactor. Stirring was performed at 80° C. for 20 minutes, and then 9.3 g of acrylonitrile was dripped from the dropping funnel for over 50 minutes. After dripping was completed, stirring was performed at 80° C. for 3 hours, and sampling was performed. Production of polyacrylonitrile (Mw=18,100, Mn=12,700, and Mw/Mn=1.42) was confirmed by gel permeation chromatography analysis.

Next, a mixed solution of 10.0 g of n-butyl acrylate and 7.8 g of ethyl acrylate was dripped from the dropping funnel for over 1 hour. Stirring was performed at 80° C. for 5 hours, and an emulsion was thereby prepared. Sampling was performed and production of a thiocarbonylthio group-terminated acrylonitrile-(n-butyl acrylate/ethyl acrylate) diblock copolymer (Mw=48,500, Mn=31,600, and Mw/Mn=1.53) was confirmed.

Diethylamine (20 g) was added into the emulsion, and stirring was performed at 60° C. for 5 hours. A salting-out method was performed, followed by filtration, washing, and drying, and a polymer was thereby produced. It was confirmed that the polymer was a mercapto group-terminated acrylonitrile-(n-butyl acrylate/ethyl acrylate) diblock copolymer (Mw=48,700, Mn=31,300, and Mw/Mn=1.56).

EXAMPLE 4

Synthesis of Mercaptide Group-terminated (Acrylonitrile/Methyl Methacrylate)-(n-butyl Acrylate/2-hydroxyethyl Acrylate) Diblock Copolymer)

Into a 1 L reactor equipped with an agitator, a thermometer, a nitrogen gas inlet tube, a dropping funnel, and a reflux condenser, was placed 200 mg of sodium dodecyl sulfate and 200 g of distilled water, and the reactor was nitrogen-purged while the reaction mixture was being stirred at 80° C. A compound (651 mg) represented by formula (6):

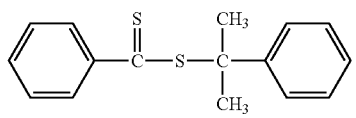

(6)

which was dissolved in 5.0 g of methyl methacrylate, was added into the reactor, and after 20 minutes, 500 mg of 4,4'-azobis(4-cyanovaleric acid) together with 12 g of distilled water was added into the reactor. Stirring was performed at 80° C. for 30 minutes, and then a mixed solution of 18.6 g of acrylonitrile and 6.8 g of methyl methacrylate was dripped from the dropping funnel for over 1 hour. Stirring was then performed at 80° C. for 6 hours, and sampling was performed. Production of a thiocarbonylthio group-terminated acrylonitrile/methyl methacrylate random copolymer was confirmed.

Next, 200 mg of 4,4'-azobis(4-cyanovaleric acid) was added into the reactor, and a mixed solution of 50.0 g of n-butyl acrylate and 18.6 g of 2-hydroxyethyl acrylate was dripped from the dropping funnel for over 3 hours. Stirring was performed at 80° C. for 5 hours, and the resultant emulsion was sampled. Production of a thiocarbonylthio group-terminated (acrylonitrile/methyl methacrylate)-(n-butyl acrylate/2-hydroxyethyl acrylate) diblock copolymer was confirmed. The emulsion was salted out, followed by filtration, washing, and drying, and the diblock copolymer was thereby prepared.

The diblock copolymer (30 g) thus obtained was dissolved in 100 mL of dehydrated toluene, and 4 g of sodium methylate was added thereinto, followed by stirring at 50° C. for 2 hours. A toluene solution containing a mercaptide group-terminated (acrylonitrile/methyl methacrylate)-(n-butyl acrylate/2-hydroxyethyl acrylate) diblock copolymer was thereby prepared. A portion of the solution was collected as a sample and hydrolyzed, and then poured into hexane to precipitate and isolate the copolymer. $^1$H NMR analysis and GPC analysis confirmed the production of a mercapto group-terminated (acrylonitrile/methyl methacrylate)-(n-butyl acrylate/2-hydroxyethyl acrylate) diblock copolymer (Mw=52,100, Mn=35,200, and Mw/Mn=1.48).

EXAMPLE 5

Synthesis of Acrylonitrile-n-butyl Acrylate-acrylonitrile Triblock Copolymer

Toluene (150 parts by weight) and lead dioxide (0.5 parts by weight) were added to the mercapto group-terminated acrylonitrile-n-butyl acrylate diblock copolymer (100 parts by weight) synthesized in Example 1, and thorough mixing was performed. The mixture was placed into a slab mold and dried in an air atmosphere at 80° C. for 15 hours. $^1$H NMR analysis, IR analysis, and gel permeation chromatography analysis confirmed that the resultant sheet-shaped polymer was an acrylonitrile-n-butyl acrylate-acrylonitrile triblock copolymer having disulfide bonds in the main chain (Mw=101,600, Mn=67,300, and Mw/Mn=1.51).

EXAMPLE 6

Synthesis of Acrylonitrile-n-butyl Acrylate-acrylonitrile Triblock Copolymer

Dehydrated toluene (200 parts by weight), hexamethylene diisocyanate (0.24 parts by weight), and dibutyltin bis (isooctyl thioglycolate) (0.001 parts by weight) were added to the mercapto group-terminated acrylonitrile-n-butyl acrylate diblock copolymer (100 parts by weight) synthesized in Example 1, and stirring was performed at 80° C. for 10 hours. The solvent was removed by distillation. $^1$H NMR analysis, IR analysis, and gel permeation chromatography analysis confirmed that the resultant polymer was an acrylonitrile-n-butyl acrylate-acrylonitrile triblock copolymer having thiourethane bonds in the main chain (Mw=99,700, Mn=66,500, and Mw/Mn=1.50).

EXAMPLE 7

Synthesis of Methacrylonitrile-n-butyl Acrylate-methacrylonitrile Triblock Copolymer Calcium dioxide (1 part by weight) was added to the mercapto group-terminated methacrylonitrile-n-butyl acrylate diblock copolymer (100 parts by weight) synthesized in Example 2, and the mixture was roll-kneaded at 100° C. and formed into a sheet. Furthermore, the sheet was heated at 100° C. for 5 hours and matured at room temperature for 3 days. $^1$H NMR analysis, IR analysis, and gel permeation chromatography analysis confirmed that the resultant sheet-shaped polymer was a methacrylonitrile-n-butyl acrylate-methacrylonitrile triblock copolymer having disulfide bonds in the main chain (Mw=102,700, Mn=71,400, and Mw/Mn=1.44).

EXAMPLE 8

Synthesis of Methacrylonitrile-n-butyl Acrylate-methacrylonitrile Triblock Copolymer Dehydrated toluene (100 parts by weight), isophorone diisocyanate (0.31 parts by weight), and dibutyltin bisacetylacetonate (0.001 parts by weight) were added to the mercapto group-terminated methacrylonitrile-n-butyl acrylate diblock copolymer (100 parts by weight) synthesized in Example 2, and the mixture was stirred at 80° C. for 8 hours. Toluene was then removed by distillation. $^1$H NMR analysis, IR analysis, and gel permeation chromatography analysis confirmed that the resultant polymer was a methacrylonitrile-n-butyl acrylate-methacrylonitrile triblock copolymer having thiourethane bonds in the main chain (Mw=98,500, Mn=69,900, and Mw/Mn=1.41).

EXAMPLE 9

Synthesis of Acrylonitrile-(n-butyl Acrylate-ethyl Acrylate)-acrylonitrile Triblock Copolymer Toluene (200 parts by weight) was added to the mercapto group-terminated acrylonitrile-(n-butyl acrylate/ethyl acrylate) diblock copolymer (100 parts by weight) synthesized in Example 3, and the mixture was stirred at 90° C. for 18 hours under blown air. Toluene was removed by distillation. $^1$H NMR analysis, IR analysis, and gel permeation chromatography analysis confirmed that the resultant polymer was an acrylonitrile-(n-butyl acrylate/ethyl acrylate)-acrylonitrile triblock copolymer having disulfide bonds in the main chain (Mw=102,400, Mn=61,100, and Mw/Mn=1.68).

EXAMPLE 10

Synthesis of Acrylonitrile-(n-butyl Acrylate/ethyl Acrylate)-acrylonitrile Triblock Copolymer Toluene (200 parts by weight) and diphenylmethane diisocyanate (0.4 parts by weight) were added to the mercapto group-terminated acrylonitrile-(n-butyl acrylate/ethyl acrylate) diblock copolymer (100 parts by weight) synthesized in Example 3, and the mixture was stirred at 100° C. for 8 hours. Toluene was removed by distillation. $^1$H NMR analysis, IR analysis, and gel permeation chromatography analysis confirmed that the resultant polymer was an acrylonitrile-(n-butyl acrylate/ethyl acrylate)-acrylonitrile triblock copolymer having thiourethane bonds in the main chain (Mw=100,700, Mn=60,900, and Mw/Mn=1.65).

EXAMPLE 11

Synthesis of (Acrylonitrile/methyl Methacrylate)-(n-butyl Acrylate/2-hydroxyethyl Acrylate)-(acrylonitrile/methyl Methacrylate) Triblock Copolymer To a toluene solution containing the (acrylonitrile/methyl methacrylate)-(n-butyl acrylate/2-hydroxyethyl acrylate) diblock copolymer (100 parts by weight on the basis of the polymer) was added 1,2-dichloroethane (0.14 parts by weight), and the mixture was stirred at 80° C. for 20 hours. The resultant toluene solution was washed with water and dried, and the solvent was removed by distillation. $^1$H NMR analysis and GPC analysis confirmed that the resultant polymer was an (acrylonitrile/methyl methacrylate)-(n-butyl acrylate/2-hydroxyethyl acrylate)-(acrylonitrile/methyl methacrylate) triblock copolymer having sulfide bonds (Mw=101,700, Mn=65,100, and Mw/Mn=1.56).

EXAMPLE 12

Synthesis of Mercapto Group-terminated Acrylonitrile-n-butyl Acrylate Diblock Copolymer Into a 2 L reactor equipped with an agitator, a thermometer, a nitrogen gas inlet tube, a dropping funnel, and a reflux condenser, was placed 490 g of distilled water, 20 g of polyoxyethylene nonylphenyl ether as a nonionic emulsifier, and 2 g of hexadecane as an emulsifying aid, and the reactor was nitrogen-purged while the reaction mixture was being stirred at 80° C. A mixed solution of 8.9 g of acrylonitrile and 1.1 g of a compound represented by formula (6):

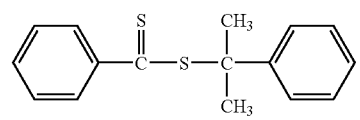

was added into the reactor, and stirring was performed at 70° C. for 30 minutes. Next, 0.92 g of 4,4'-azobis(4-cyanovaleric acid) together with 25 g of distilled water was added into the reactor. Stirring was performed at 70° C. for 1 hour, and then 45 g of acrylonitrile was dripped from the dropping funnel for over 1 hour. As soon as dripping was completed, the temperature was raised to 80° C. and stirring was performed for 5 hours. Sampling was then performed. Production of polyacrylonitrile (Mw=13,000, Mn=10,000, and Mw/Mn=1.30) was confirmed by gel permeation chromatography analysis.

Next, 20 g of n-butyl acrylate was added into the reactor, and 0.25 g of 4,4'-azobis(4-cyanovaleric acid) together with 5 g of distilled water was further added thereinto. Stirring was performed at 80° C. for 1 hour, and then 80 g of n-butyl acrylate was dripped from the dropping funnel for over 2 hours. After dripping was completed, the mixture was stirred at 80° C. for 6 hours and then cooled to room temperature. A salting-out method was performed, followed by filtration, washing, and drying. Thereby, production of an acrylonitrile-n-butyl acrylate diblock copolymer (Mw=47,500, Mn=34,000, and Mw/Mn=1.40) was confirmed.

The diblock copolymer (50 g) thus produced was dissolved in 200 mL of toluene, and 20 g of diethylamine was added thereinto, followed by stirring at 50° C. for 8 hours. The reaction solution was purified with a silica gel column, and toluene was removed by distillation. $^1$H NMR analysis and IR analysis confirmed that the thiocarbonylthio groups at ends were quantitatively converted into mercapto groups.

EXAMPLE 13

Synthesis of Acrylonitrile-n-butyl Acrylate-acrylonitrile Triblock Copolymer Toluene (100 parts by weight), dimethylformamide (50 parts by weight), and lead dioxide (0.5 parts by weight) were added to the mercapto group-terminated acrylonitrile-n-butyl acrylate diblock copolymer (100 parts by weight) synthesized in Example 12, and thorough mixing was performed. The mixture was placed into a slab mold and dried in an air atmosphere at 80° C. for 5 hours. Deaeration was performed under reduced pressure at 80° C. to remove the solvent, and heating was further performed in an air atmosphere at 80° C. for 10 hours. $^1$H NMR analysis, IR analysis, and gel permeation chromatography analysis confirmed that the resultant polymer constituting the sheet was an acrylonitrile-n-butyl acrylate-acrylonitrile triblock copolymer having disulfide bonds in the main chain (Mw=99,900, Mn=66,500, and Mw/Mn=1.50).

PRODUCTION EXAMPLE 1

Synthesis of mercapto group-terminated polyacrylonitrile

Into a 2 L reactor equipped with an agitator, a thermometer, a nitrogen gas inlet tube, a dropping funnel, and a reflux condenser, was placed 490 g of distilled water and 0.56 g of sodium dodecyl sulfate, and the reactor was nitrogen-purged while the reaction mixture was being stirred at 80° C. A mixed solution of 8.8 g of acrylonitrile and 1.09 g of 2-(2-phenylpropyl)dithiobenzoate represented by formula (6):

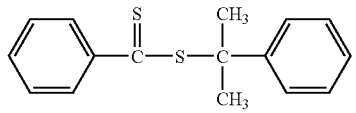

(6)

was added into the reactor, and stirring was performed at 80° C. for 15 minutes under nitrogen flow. Next, 0.93 g of 4,4'-azobis(4-cyanovaleric acid) together with 25 g of distilled water was added into the reactor. Stirring was performed at 80° C. for 1 hour, and then 45.0 g of acrylonitrile was dripped from the dropping funnel for over 2 hours. After dripping was completed, stirring was further performed at 80° C. for 5 hours. The resultant emulsion was cooled to 30° C., and 30 g of monoethylamine was added thereinto, followed by stirring at 30° C. for 10 hours. The emulsion was salted out, followed by filtration and washing. Polyacrylonitrile having a mercapto group at one end was thereby produced (Mw=13,400, Mn=10,800, and Mw/Mn=1.24).

PRODUCTION EXAMPLE 2

Synthesis of Mercapto Group-terminated Acrylonitrile-methyl Methacrylate Random Copolymer Into a 1 L reactor equipped with an agitator, a thermometer, a nitrogen gas inlet tube, a dropping funnel, and a reflux condenser, was placed 200 mg of sodium dodecyl sulfate and 200 g of distilled water, and the reactor was nitrogen-purged while the reaction mixture was being stirred at 80° C. 2-(2-Phenylpropyl)dithiobenzoate (651 mg) represented by formula (6):

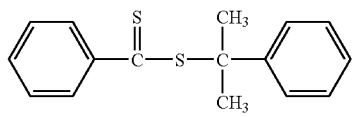

(6)

was dissolved in a mixed solution of 18.6 g of acrylonitrile and 11.8 g of methyl methacrylate, and the solution was dripped from the dropping funnel at one time. After 20 minutes, 500 mg of 4,4'-azobis(4-cyanovaleric acid) together with 12 g of distilled water was added into the reactor. Stirring was performed at 80° C. for 4 hours, and the reaction mixture was cooled to 30° C. Monoethylamine (10 g) was added thereinto, and stirring was performed at 30° C. for 10 hours. The resultant emulsion was salted out, followed by filtration and washing. An acrylonitrile-methyl methacrylate random copolymer having a mercapto group at one end was thereby produced (Mw=11,100, Mn=9,700, and Mw/Mn=1.14).

PRODUCTION EXAMPLE 3

Synthesis of poly(n-butyl acrylate) having mercapto group at one end

Into a 2 L reactor equipped with an agitator, a thermometer, a nitrogen gas inlet tube, a dropping funnel, and a reflux condenser, was placed 0.56 g of sodium dodecyl sulfate and 490 g of distilled water, and the reactor was nitrogen-purged while the reaction mixture was being stirred at 80° C. 2-(2-Phenylpropyl)dithiobenzoate (1.09 g) represented by formula (6):

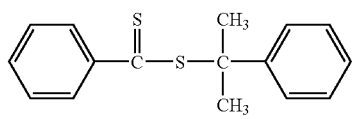

(6)

was dissolved in 16.5 g of n-butyl acrylate, and the solution was dripped from the dropping funnel at one time. After 20 minutes, 0.93 g of 4,4'-azobis(4-cyanovaleric acid) together with 25 g of distilled water was added into the reactor. Stirring was performed at 80° C. for 30 minutes, and then 100 g of n-butyl acrylate was dripped from the dropping funnel for over 2 hours. Stirring was further performed at 80° C. for 5 hours, and the reaction mixture was cooled to 30° C. Monoethylamine (30 g) was added thereinto, and stirring was performed at 30° C. for 10 hours. The resultant emulsion was salted out, followed by filtration and washing. Poly(n-butyl acrylate) having a mercapto group at one end was thereby produced (Mw=38,900, Mn=30,900, and Mw/Mn=1.26).

PRODUCTION EXAMPLE 4

Synthesis of poly(n-butyl acrylate) having mercapto groups at both ends

Into a 1 L reactor equipped with an agitator, a thermometer, a nitrogen gas inlet tube, and a reflux condenser tube, was placed 181 g of n-butyl acrylate, 40 mg of 1,1'-azobis(1-cyclohexanecarbonitrile), 635 mg of 1,4-bis(thiobenzoylthiomethyl)benzene represented by formula (7):

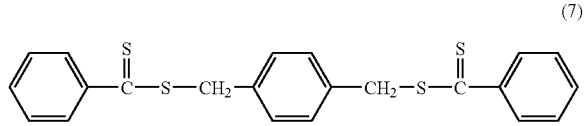

(7)

and 300 mL of toluene, and the reactor was nitrogen-purged. The reaction liquid was heated at 90° C. for 5 hours while being stirred. Sampling was performed, and GPC analysis confirmed the production of a polymer (Mw=77,000, Mn=56,900, and Mw/Mn=1.35). $^1$H NMR measurement confirmed that thiocarbonylthio groups were introduced into both ends of poly(n-butyl acrylate), and the introduction rate was 93% on the both-ends basis. The conversion rate of n-butyl acrylate was 55%.

Monoethylamine (30 g) was added into the resultant toluene solution containing poly(n-butyl acrylate) having thiocarbonylthio groups at both ends, followed by stirring at 30° C. for 5 hours. Sampling was performed, and $^1$H NMR measurement confirmed the production of poly(n-butyl acrylate) having mercapto groups at both ends. The introduction rate of mercapto groups was 90% on the both-ends basis.

PRODUCTION EXAMPLE 5

Synthesis of n-butyl acrylate-2-methoxyethyl acrylate random copolymer

Into a 1 L reactor equipped with an agitator, a thermometer, a nitrogen gas inlet tube, a reflux condenser, and a dropping funnel, was placed 410 mg of sodium dodecyl sulfate and 400 g of distilled water, and the reactor was nitrogen-purged while the reaction mixture was being stirred at 80° C. A compound (23.34 g) represented by formula (8):

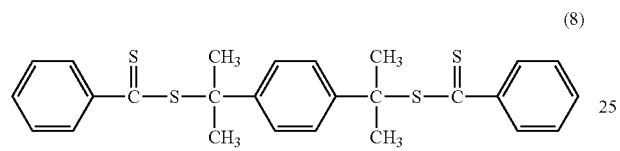

(8)

which was dissolved in 50 g of n-butyl acrylate, was added into the reactor, and stirring was performed at 80° C. for 20 minutes under nitrogen flow. Next, 7.0 g of 4,4'-azobis(4-cyanovaleric acid) together with 25 g of distilled water was added thereinto. Stirring was performed at 80° C. for 30 minutes, and then a mixed solution of 100 g of n-butyl acrylate and 50 g of 2-methoxyethyl acrylate was dripped from the dropping funnel for over 1.5 hours. After dripping was completed, the mixture was stirred at 80° C. for 4 hours, and the resultant emulsion was then cooled to room temperature. A salting-out method was performed, followed by filtration and washing. Thereby, an n-butyl acrylate-2-methoxyethyl acrylate random copolymer having thiocarbonylthio groups at both ends was produced. GPC analysis and $^1$H NMR analysis confirmed that in the polymer, Mw=4,320, Mn=3,970, and Mw/Mn=1.09 and that the introduction rate of thiocarbonylthio groups was 97% on the both-ends basis.

The polymer having thiocarbonylthio group at both ends (180 g) was dissolved in 200 mL of toluene, and 20 g of monoethylamine was added thereinto, followed by stirring at 5° C. for 10 hours. By removing excess monoethylamine and toluene, an n-butyl acrylate-2-methoxyethyl acrylate random copolymer having mercapto groups at both ends was produced.

PRODUCTION EXAMPLE 6

Synthesis of mercapto group-terminated poly(vinyl chloride)

Into a 300 L stainless steel autoclave was placed 130 kg of ion-exchanged water, 100 kg of vinyl chloride monomer, 500 g of 2,2'-azobis(isobutylvaleronitrile), 400 g of sodium lauryl sulfate, and 110 g of a compound represented by formula (9) below.

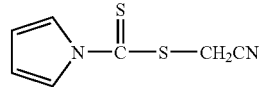

(9)

Homogenizing was performed for 90 minutes with a homogenizer, and polymerization was then carried out at 50° C. When the internal pressure of the reactor became lower than the saturated vapor pressure of the vinyl chloride monomer at 50° C. by 1 kg/cm$^2$, unreacted monomers were removed from the reactor by distillation. A vinyl chloride polymer latex was thereby produced. Excess vinyl chloride was removed, and the reactor was filled with ammonia at a rate of 5 kg/cm$^2$ (20° C.). Stirring was performed at 50° C. for 5 hours. By spray drying the emulsion, mercapto group-terminated poly(vinyl chloride) was produced (Mw=61,000, Mn=41,000, and Mw/Mn=1.49).

PRODUCTION EXAMPLE 7

Synthesis of mercapto group-terminated polyacrylonitrile

Into a 2 L reactor equipped with an agitator, a thermometer, a nitrogen gas inlet tube, a dropping funnel, and a reflux condenser, was placed 490 g of distilled water, 20 g of polyethylene glycol nonylphenyl ether as a nonionic emulsifier, and 2 g of hexadecane as an emulsifying aid, and the reactor was nitrogen-purged while the reaction mixture was being stirred at 80° C. A mixed solution of 8.9 g of acrylonitrile and 1.1 g of a compound represented by formula (6):

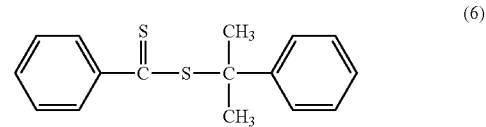

(6)

was added into the reactor, and stirring was performed at 70° C. for 30 minutes. Next, 0.92 g of 4,4'-azobis(4-cyanovaleric acid) together with 25 g of distilled water was added into the reactor. Stirring was performed at 70° C. for 1 hour, and then 45 g of acrylonitrile was dripped from the dropping funnel for over 1 hour. As soon as dripping was completed, the temperature was raised to 80° C. and stirring was performed for 6 hours. The mixture was cooled to room temperature, and an emulsion was prepared. The emulsion was dried and washed with acetone, and then reprecipitation was performed with dimethylformamide-acetone. Polyacrylonitrile was thereby produced. Gel permeation chromatography analysis confirmed that Mw=13,100, Mn=9,800, and Mw/Mn=1.34.

The resultant polyacrylonitrile (30 g) was dissolved in 300 mL of dimethylformamide, and 8 g of diethylamine was added thereinto, followed by stirring at 50° C. for 10 hours. The reaction solution was concentrated and reprecipitated with methanol. Mercapto group-terminated polyacrylonitrile was thereby produced. NMR analysis confirmed that the introduction rate of mercapto groups was 91% on the single-end basis.

EXAMPLE 14

Synthesis of acrylonitrile-n-butyl acrylate diblock copolymer

The poly(n-butyl acrylate) (286 parts by weight) synthesized in Production Example 3, toluene (300 parts by weight), and lead dioxide (0.5 parts by weight) were added to the mercapto group-terminated polyacrylonitrile (100 parts by weight) synthesized in Production Example 1, and the mixture was stirred at 80° C. for 10 hours in an air atmosphere. $^1$H NMR analysis confirmed that an acrylonitrile-n-butyl acrylate diblock copolymer in which coupling was performed via disulfide bonds was produced. GPC analysis confirmed that Mw=61,400, Mn=45,400, and Mw/Mn=1.35.

EXAMPLE 15

Synthesis of acrylonitrile-n-butyl acrylate-acrylonitrile triblock copolymer In a nitrogen atmosphere, dehydrated toluene (300 parts by weight), isophorone diisocyanate (0.70 parts by weight), and dibutyltin bis(isooctyl thioglycolate) (0.05 parts by weight) were added to the poly(n-butyl acrylate) having mercapto groups at both ends (100 parts by weight) synthesized in Production Example 4, and the mixture was stirred at 80° C. for 8 hours to synthesize poly(n-butyl acrylate) having isocyanato groups at both ends. The mercapto group-terminated polyacrylonitrile (34 parts by weight) synthesized in Production Example 1 was added thereinto, and stirring was performed at 80° C. for 16 hours. $^1$H NMR and GPC analysis confirmed that an acrylonitrile-n-butyl acrylate-acrylonitrile triblock copolymer was produced (Mw=127,000, Mn=84,500, and Mw/Mn=1.50).

EXAMPLE 16

Synthesis of acrylonitrile-(n-butyl acrylate/2-methoxyethyl acrylate)-acrylonitrile triblock copolymer In a nitrogen atmosphere, dehydrated toluene (300 parts by weight), isophorone diisocyanate (7.24 parts by weight), and dibutyltin bis(isooctyl thioglycolate) (0.05 parts by weight) were added to the n-butyl acrylate-2-methoxyethyl acrylate random copolymer having mercapto groups at both ends (100 parts by weight) synthesized in Production Example 5, and the mixture was stirred at 80° C. for 10 hours to synthesize an n-butyl acrylate/2-methoxyethyl acrylate random copolymer having isocyanato groups at both ends. The mercapto group-terminated polyacrylonitrile (176 parts by weight) synthesized in Production Example 1 was added thereinto, and stirring was performed at 80° C. for 16 hours. $^1$H NMR and GPC analysis confirmed that an acrylonitrile-(n-butyl acrylate/2-methoxyethyl acrylate)-acrylonitrile triblock copolymer was produced (Mw=76,700, Mn=43,600, and Mw/Mn=1.76).

EXAMPLE 17

Synthesis of acrylonitrile-vinyl chloride diblock copolymer

The mercapto group-terminated poly(vinyl chloride) (380 parts by weight) synthesized in Production Example 6 and lead dioxide (1 part by weight) were added to the mercapto group-terminated polyacrylonitrile (100 parts by weight) synthesized in Production Example 1, and the mixture was melt-kneaded with a twin-screw extruder (inlet temperature 80° C.; outlet temperature 160° C.) and formed into a strand. The resultant strand was cut into pellets. The pellets were dried by heating at 80° C. for 30 hours in an air atmosphere. $^1$H NMR and GPC analysis confirmed that an acrylonitrile-vinyl chloride diblock copolymer was produced (Mw=71,100, Mn=49,400, and Mw/Mn=1.44).

EXAMPLE 18

Synthesis of (acrylonitrile/methyl methacrylate)-n-butyl acrylate diblock copolymer In a nitrogen atmosphere, dehydrated toluene (300 parts by weight), hexamethylene diisocyanate (5.78 parts by weight), and dibutyltin bis(isooctyl thioglycolate) (0.05 parts by weight) were added to the mercapto group-terminated acrylonitrile/methyl methacrylate random copolymer (100 parts by weight) synthesized in Production Example 2, and the mixture was stirred at 80° C. for 10 hours to produce an isocyanato group-terminated acrylonitrile/methyl methacrylate random copolymer. The mercapto group-terminated poly(n-butyl acrylate) (105 parts by weight) synthesized in Production Example 3 was added thereinto, and stirring was performed at 100° C. for 8 hours in a nitrogen atmosphere. $^1$H NMR and GPC analysis confirmed that an (acrylonitrile/methyl methacrylate)-n-butyl acrylate diblock copolymer was produced (Mw=62,900, Mn=45,200, and Mw/Mn=1.39).

EXAMPLE 19

Synthesis of (acrylonitrile/methyl methacrylate)-n-butyl acrylate-(acrylonitrile/methyl methacrylate) triblock copolymer In a nitrogen atmosphere, dehydrated toluene (500 parts by weight), isophorone diisocyanate (0.70 parts by weight), and dibutyltin bis(isooctyl thioglycolate) (0.05 parts by weight) were added to the poly(n-butyl acrylate) having mercapto groups at both ends (100 parts by weight) synthesized in Production Example 4, and the mixture was stirred at 80° C. for 8 hours to synthesize poly(n-butyl acrylate) having isocyanato groups at both ends. The mercapto group-terminated acrylonitrile-methyl methacrylate diblock copolymer (92 parts by weight) synthesized in Production Example 2 was added thereinto, and stirring was performed at 80° C. for 16 hours. $^1$H NMR and GPC analysis confirmed that an (acrylonitrile/methyl methacrylate)-n-butyl acrylate-(acrylonitrile/methyl methacrylate) triblock copolymer was produced (Mw=122,100, Mn=78,900, and Mw/Mn=1.55).

EXAMPLE 20

Synthesis of (acrylonitrile/methyl methacrylate)-(n-butyl acrylate/2-methoxyethyl acrylate)-(acrylonitrile/methyl methacrylate) triblock copolymer In a nitrogen atmosphere, dehydrated toluene (500 parts by weight), isophorone diisocyanate (7.22 parts by weight), and dibutyltin bis(isooctyl thioglycolate) (0.05 parts by weight) were added to the n-butyl acrylate/2-methoxyethyl acrylate random copolymer having mercapto groups at both ends (100 parts by weight) synthesized in Production Example 5, and the mixture was stirred at 80° C. for 10 hours to synthesize an n-butyl acrylate/2-methoxyethyl acrylate random copolymer having isocyanato groups at both ends. The mercapto group-terminated acrylonitrile/methyl methacrylate random copolymer (474 parts by weight) synthesized in Production Example 2 was added thereinto, and stirring was performed at 80° C. for 15 hours. $^1$H NMR and GPC analysis confirmed that an (acrylonitrile/methyl methacrylate)-(n-butyl acrylate/2-methoxyethyl acrylate)-(acrylonitrile/methyl methacrylate) triblock copolymer was produced (Mw=57,700, Mn=35,500, and Mw/Mn=1.63).

EXAMPLE 21

Synthesis of (acrylonitrile/methyl methacrylate)-vinyl chloride diblock copolymer The mercapto group-terminated poly(vinyl chloride) (141 parts by weight) synthesized in Production Example 6, tetrahydrofuran (300 parts by weight), and lead dioxide (0.5 parts by weight) were added to the mercapto group-terminated acrylonitrile/methyl methacrylate random copolymer (100 parts by weight) synthesized in Production Example 2, and the mixture was stirred at 80° C. for 10 hours in an air atmosphere. $^1$H NMR analysis confirmed that an (acrylonitrile/methyl methacrylate)-vinyl chloride diblock copolymer in which coupling was performed via disulfide bonds was produced. GPC analysis confirmed that Mw=68,200, Mn=46,200, and Mw/Mn=1.48.

EXAMPLE 22

Synthesis of acrylonitrile-n-butyl acrylate-acrylonitrile triblock copolymer

In a nitrogen atmosphere, dehydrated toluene (300 parts by weight), allyl isocyanate (0.5 parts by weight), and dibutyltin bis(isooctyl thioglycolate) (0.02 parts by weight) were added to the poly(n-butyl acrylate) having mercapto groups at both ends (100 parts by weight) synthesized in Production Example 4, and the mixture was stirred at 80° C. for 5 hours. Dibutyltin bis(isooctyl thioglycolate) and excess allyl isocyanate were removed through a silica gel column (50 parts by weight), and toluene was removed by distillation. Thereby, poly(n-butyl acrylate) having allyl groups at both ends via thiourethane bonds was produced. NMR analysis confirmed that the introduction rate of allyl groups was 89% on the both-ends basis.

On the other hand, the polyacrylonitrile (100 parts by weight) synthesized in Production Example 7 was dissolved in dimethylformamide (300 parts by weight), and 3-isocyanatopropyldimethylsilane (1.4 parts by weight) and dibutyltin bisacetylacetonate (0.01 parts by weight) were added thereinto, followed by stirring at 80° C. for 6 hours. The reaction solution was concentrated and reprecipitated with methanol. Polyacrylonitrile having a hydrosilyl group at one end was thereby produced. NMR analysis confirmed that the introduction rate of hydrosilyl groups was 88% on the single-end basis.

Dimethylformamide (300 parts by weight) was added to a mixture of the resultant polyacrylonitrile having the hydrosilyl group at one end (100 parts by weight) and the poly(n-butyl acrylate) having the allyl group at both ends, and a 3% by weight xylene solution of platinum-1,3-divinyltetramethyldisiloxane complex (0.3 parts by weight) was added thereinto. After the mixture was matured at 80° C. for 8 hours, dimethylformamide was removed by distillation. Toluene (200 parts by weight) was added thereto, and insolubles were removed. The solution was poured into methanol (500 parts by weight), and reprecipitation was performed. Thereby, an acrylonitrile-n-butyl acrylate-acrylonitrile triblock copolymer was produced (Mw=128,800, Mn=73,200, and Mw/Mn=1.76).

COMPARATIVE PRODUCTION EXAMPLE 1

Synthesis of acrylonitrile/n-butyl acrylate random copolymer

Into a 2 L reactor equipped with an agitator, a thermometer, a nitrogen gas inlet tube, a dropping funnel, and a reflux condenser, was placed 600 g of distilled water, 0.71 g of sodium dodecyl sulfate as an emulsifier, and as monomers, 70 g of acrylonitrile and 30 g of n-butyl acrylate, and the reactor was nitrogen-purged while the reaction mixture was being stirred at 80° C. Next, 1.6 g of 4,4'-azobis(4-cyanovaleric acid) as a polymerization initiator together with 30 g of distilled water was added into the reactor, and a reaction was initiated. Stirring was performed at 80° C. for 10 hours, and an acrylonitrile/n-butyl acrylate random copolymer was produced with a conversion rate of monomers of 89%. GPC measurement confirmed that Mw=472,000, Mn=214,000, and Mw/Mn=2.21.

EXAMPLE 23

Polycarbonate thermoplastic resin composition

A polycarbonate resin LEXAN 141R-111 (manufactured by GE Plastics Japan, Ltd.) (100 parts by weight) as a thermoplastic resin, IRGANOX HP2215 (manufactured by Ciba Specialty Chemicals) (0.5 parts by weight) as a stabilizer, and the block copolymer synthesized in Example 1 (6 parts by weight) were compounded. The resultant composition was extrusion-kneaded at 280° C. with a twin-screw extruder (32 mm, L/D=25.5) and pelletized. The resultant pellets were dried at 80° C. for 15 hours, and injection molding was then performed at 280° C. to form a molded object (¼ inch thick) for evaluating physical properties. The Izod impact strength at 0° C. and flame retardancy of the resultant molded object were evaluated. The results thereof are shown in Table 1 below.

Additionally, Izod impact strength was measured according to ASTM D256-56, using V-notched specimens, and average values measured at n=5 were adopted. Flame retardancy was measured according to UL-94 standard.

EXAMPLES 24 TO 44

Molded objects were formed as in Example 23 except that the block copolymers synthesized in Examples 2 to 22 were used instead of the block copolymer synthesized in Example 1. The Izod impact strength at 0C and flame retardancy were evaluated. The results thereof are shown in Table 1.

COMPARATIVE EXAMPLE 1

A molded object was formed as in Example 23 except that the random copolymer synthesized in Comparative Production Example 1 was used instead of the block copolymer synthesized in Example 1. The Izod impact strength at 0° C. and flame retardancy were evaluated. The results thereof are shown in Table 1.

COMPARATIVE EXAMPLE 2

A molded object was formed as in Example 23 without compounding the block copolymer synthesized in Example 1. The Izod impact strength at 0C and flame retardancy were evaluated. The results thereof are shown in Table 1.

TABLE 1

| Example | Composition | Izod impact strength (kJ/m²) | Flame retardancy |
| --- | --- | --- | --- |
| Example 23 | Example 1 | 10.5 | V-2 |
| Example 24 | Example 2 | 9.7 | V-2 |
| Example 25 | Example 3 | 11.4 | V-2 |
| Example 26 | Example 4 | 11.5 | V-1 |
| Example 27 | Example 5 | 15.2 | V-1 |
| Example 28 | Example 6 | 16.1 | V-1 |
| Example 29 | Example 7 | 11.8 | V-1 |
| Example 30 | Example 8 | 11.8 | V-1 |
| Example 31 | Example 9 | 14.9 | V-1 |
| Example 32 | Example 10 | 12.5 | V-1 |
| Example 33 | Example 11 | 10.1 | V-0 |
| Example 34 | Example 12 | 10.0 | V-2 |
| Example 35 | Example 13 | 14.7 | V-2 |
| Example 36 | Example 14 | 9.1 | V-2 |
| Example 37 | Example 15 | 13.3 | V-2 |
| Example 38 | Example 16 | 12.0 | V-1 |
| Example 39 | Example 17 | 7.2 | V-0 |
| Example 40 | Example 18 | 8.8 | V-2 |
| Example 41 | Example 19 | 17.1 | V-1 |
| Example 42 | Example 20 | 16.1 | V-1 |
| Example 43 | Example 21 | 7.7 | V-0 |
| Example 44 | Example 22 | 10.2 | V-1 |
| Comparative Example 1 | Comparative Production Example 1 | 4.1 | notV |
| Comparative Example 2 | — | 2.9 | notV |

As is evident from Table 1, the thermoplastic resin compositions in which the block copolymers of the present invention are compounded are excellent in impact strength at low temperatures and flame retardancy.

EXAMPLE 45

Polyester Thermoplastic Resin Composition

A poly(butylene terephthalate) resin DURANEX 2002 (manufactured by Polyplastic Co., Ltd.) (80 parts by weight) as a thermoplastic resin, Topanol Calif. (manufactured by Lipre Co., Ltd.) (0.3 parts by weight) as a phenolic antioxidant, Adekasutabu PEP-36 (manufactured by Asahi Denka Co., Ltd.) (0.3 parts by weight) as a HALS, and the block copolymer synthesized in Example 1 (20 parts by weight) were compounded. Using a twin-screw extruder (32 mm, L/D=25.5), the resultant composition was extrusion-kneaded at 245° C. and pelletized. The resultant pellets were dried at 80° C. for 15 hours, and injection molding was then performed at 250° C. to form a molded object (¼ inch thick) for evaluating physical properties. The Izod impact strength at 0° C. of the resultant molded object was evaluated. The result thereof is shown in Table 2 below.

EXAMPLES 46 TO 66

Molded objects were formed as in Example 45 except that the block copolymers synthesized in Examples 2 to 22 were used instead of the block copolymer synthesized in Example 1. The Izod impact strength at 0° C. of each resultant molded object was evaluated. The results thereof are shown in Table 2.

COMPARATIVE EXAMPLE 3

A molded object was formed as in Example 45 except that the random copolymer synthesized in Comparative Production Example 1 was used instead of the block copolymer synthesized in Example 1. The Izod impact strength at 0° C. was evaluated. The result thereof is shown in Table 2.

COMPARATIVE EXAMPLE 4

A molded object was formed as in Example 45 without compounding the block copolymer synthesized in Example 1. The Izod impact strength at 0° C. was evaluated. The result thereof is shown in Table 2.

TABLE 2

| Example | Composition | Izod impact strength (kJ/m²) |
| --- | --- | --- |
| Example 45 | Example 1 | 9.6 |
| Example 46 | Example 2 | 8.5 |
| Example 47 | Example 3 | 9.3 |
| Example 48 | Example 4 | 10.1 |
| Example 49 | Example 5 | 11.5 |
| Example 50 | Example 6 | 11.8 |
| Example 51 | Example 7 | 10.1 |
| Example 52 | Example 8 | 9.1 |
| Example 53 | Example 9 | 12.5 |
| Example 54 | Example 10 | 10.9 |
| Example 55 | Example 11 | 9.1 |
| Example 56 | Example 12 | 8.3 |
| Example 57 | Example 13 | 11.1 |
| Example 58 | Example 14 | 9.0 |
| Example 59 | Example 15 | 10.8 |
| Example 60 | Example 16 | 10.7 |
| Example 61 | Example 17 | 8.1 |
| Example 62 | Example 18 | 8.3 |
| Example 63 | Example 19 | 13.2 |
| Example 64 | Example 20 | 13.7 |
| Example 65 | Example 21 | 7.8 |
| Example 66 | Example 22 | 9.3 |
| Comparative Example 3 | Comparative Production Example 1 | 3.1 |
| Comparative Example 4 | — | 2.8 |

As is evident from Table 2, the thermoplastic resin compositions in which the block copolymers of the present invention are compounded are excellent in impact strength at low temperatures.

EXAMPLE 67

Elastomer Composition

An acrylic rubber AR42W (manufactured by ZEON Corporation) (100 parts by weight) and the block copolymer synthesized in Example 1 (100 parts by weight) were compounded and melt-kneaded with a Laboplastomill at 190° C. After 3 minutes, as a crosslinking agent, ammonium benzoate (3 parts by weight) was added thereinto, and melt-kneading was further performed with the Laboplastomill at 190° C. The resultant sample block was thermopress-molded at 190° C., and molded objects with a thickness of 2 mm for evaluating physical properties were formed. The resultant molded objects were crosslinked by heating at 150° C. for 2 hours. With respect to the molded objects, tensile strength at break and elongation at break at 0° C., and oil resistance were evaluated. The results thereof are shown in Table 3 below.

Additionally, tensile strength at break and elongation at break were measured according to JIS K6251, at 0° C. With respect to oil resistance, according to JIS C232, molded objects were immersed in transformer oil B at 70° C. for 4 hours, and the oil resistance was measured based on the rates of change in weight.

EXAMPLES 68 TO 88

Molded objects were formed as in Example 67 except that the block copolymers synthesized in Examples 2 to 22 were used instead of the block copolymers synthesized in Example 1. The tensile strength at break and elongation at break at 0° C., and oil resistance were evaluated. The results thereof are shown in Table 3.

COMPARATIVE EXAMPLE 5

Molded objects were formed as in Example 67 except that the random copolymer synthesized in Comparative Production Example 1 was used instead of the block copolymer synthesized in Example 1. The tensile strength at break and elongation at break at 0° C., and oil resistance were evaluated. The results thereof are shown in Table 3.

COMPARATIVE EXAMPLE 6

Molded objects were formed as in Example 67 without compounding the block copolymer synthesized in Example 1. The tensile strength at break and elongation at break at 0° C., and oil resistance were evaluated. The results thereof are shown in Table 3.

TABLE 3

| Example | Composition | Tensile strength at break (MPa) | Elongation at break (%) | Oil resistance (%) |
|---|---|---|---|---|
| Example 67 | Example 1 | 4.1 | 340 | 11 |
| Example 68 | Example 2 | 5.2 | 310 | 9 |
| Example 69 | Example 3 | 4.8 | 300 | 7 |
| Example 70 | Example 4 | 3.5 | 420 | 4 |
| Example 71 | Example 5 | 7.1 | 220 | 12 |
| Example 72 | Example 6 | 6.6 | 230 | 11 |
| Example 73 | Example 7 | 5.9 | 280 | 10 |
| Example 74 | Example 8 | 4.5 | 270 | 10 |
| Example 75 | Example 9 | 6.0 | 240 | 6 |
| Example 76 | Example 10 | 6.9 | 250 | 7 |
| Example 77 | Example 11 | 8.1 | 200 | 4 |
| Example 78 | Example 12 | 4.0 | 300 | 13 |
| Example 79 | Example 13 | 5.0 | 270 | 14 |
| Example 80 | Example 14 | 3.7 | 360 | 14 |
| Example 81 | Example 15 | 4.2 | 350 | 13 |
| Example 82 | Example 16 | 4.5 | 330 | 11 |
| Example 83 | Example 17 | 3.0 | 470 | 8 |
| Example 84 | Example 18 | 3.9 | 370 | 15 |
| Example 85 | Example 19 | 4.0 | 370 | 14 |
| Example 86 | Example 20 | 6.2 | 210 | 16 |
| Example 87 | Example 21 | 3.3 | 440 | 8 |
| Example 88 | Example 22 | 3.7 | 420 | 11 |
| Comparative Example 5 | Comparative Production Example 1 | 1.4 | 500 | 28 |
| Comparative Example 6 | — | 1.6 | 490 | 21 |

As is evident from Table 3, the elastomer compositions in which the block copolymers of the present invention are compounded are excellent in strength at low temperatures and oil resistance.

INDUSTRIAL APPLICABILITY

As described above, in accordance with the present invention, it is possible to produce (meth)acrylonitrile-based block copolymers which are excellent in heat resistance, weatherability, oil resistance, flame retardancy, and low-temperature resistance. The block copolymers can be prepared by water-based polymerization and the purification step can be simplified, and thus economical production is enabled. The thermoplastic resin compositions and elastomer compositions containing the block copolymers can be used in various applications, such as films, sheets, tapes, hoses, tubes, gaskets, packings, grips, containers, various molded objects, sealants, damping materials, pressure-sensitive adhesives, adhesives, coating materials, potting materials, and textiles.

The invention claimed is:

1. A block copolymer prepared by coupling of the block copolymer,
   wherein the block copolymer comprises a polymer block (A) and a polymer block (B), the block copolymer being produced by forming the polymer block (A) by reversible addition-fragmentation chain transfer polymerization in the presence of a thiocarbonylthio group-containing compound, and then by forming the polymer block (B),
   wherein the polymer block (A) is prepared by (co)polymerizing 50% to 100% by weight of at least one monomer selected from the group consisting of acrylonitrile and methacrylonitrile and 50% to 0% by weight of at least one monomer selected from the group consisting of methacrylate esters, styrene, and α-methylstyrene, and the polymer block (B) is prepared by (co)polymerizing at least one monomer selected from the group consisting of acrylic acid, methacrylic acid, acrylate esters, methacrylate esters, vinyl acetate, styrene, α-methylstyrene, butadiene, isoprene, and vinyl chloride,
   wherein the thiocarbonylthio group of the block copolymer is converted into a mercapto group or a mercaptide group, and
   wherein said coupling is performed by a reaction of the mercapto group of the block copolymer or the mercaptide group of the block copolymer with another mercapto group of the block copolymer or another mercaptide group of the block copolymer.

2. The block copolymer according to claim 1, wherein the thiocarbonylthio group-containing compound is at least one compound selected from the group consisting of a compound represented by general formula (1):

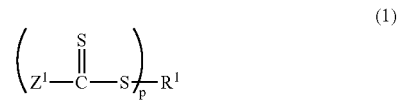

(wherein R1 is a p-valent organic group of 1 or more carbon atoms which may contain one of nitrogen, oxygen, sulfur, halogen, silicon, phosphorus, and metal atoms, or which may be a polymer; Z1 is a hydrogen atom, halogen atom, or monovalent organic group of 1 or more carbon atoms which may contain one of nitrogen, oxygen, sulfur, halogen, silicon, and phosphorus atoms, or which may be a polymer; when plural Z1s are present, the plural Z1s may be the same or different; and p is an integer of 1 or more), and a compound represented by general formula (2):

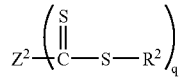

(2)

(wherein R2 is a monovalent organic group of 1 or more carbon atoms which may contain one of nitrogen, oxygen, sulfur, halogen, silicon, phosphorus, and metal atoms, or which may be a polymer; Z2 is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, or which may be a polymer; plural R2s may be the same or different; and q is an integer of 2 or more).

3. The block copolymer according to claim 1, wherein the thiocarbonylthio group-containing compound is a compound represented by general formula (3):

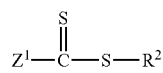

(3)

(wherein R2 is a monovalent organic group of 1 or more carbon atoms which may contain one of nitrogen, oxygen, sulfur, halogen, silicon, phosphorus, and metal atoms, or which may be a polymer; and Z1 is a hydrogen atom, halogen atom, or monovalent organic group of 1 or more carbon atoms which may contain one of nitrogen, oxygen, sulfur, halogen, silicon, and phosphorus atoms, or which may be a polymer).

4. The block copolymer according to claim 1, wherein the thiocarbonylthio group of the thiocarbonylthio group-containing block copolymer is converted into the mercapto group or the mercaptide group by a reaction with a processing agent comprising at least one compound selected from the group consisting of bases, acids, and hydrogen-nitrogen bond-containing compounds.

5. The block copolymer according to claim 4, wherein the processing agent is at least one compound selected from the group consisting of ammonia, primary amine compounds with a boiling point of 100° C. or less, secondary amine compounds with a boiling point of 100° C. or less, and hindered amine light stabilizers (HALSs).

6. The block copolymer according to claim 1, wherein said coupling is performed by the formation of disulfide bonds using an oxidizing agent.

7. The block copolymer according to claim 1, wherein a functional group is introduced into the mercapto group or the mercaptide group for performing said coupling.

8. The block copolymer according to claim 7, wherein said coupling is performed using at least one functional group selected from the group consisting of a crosslinkable silyl group, unsaturated groups, and a hydroxyl group.

9. The block copolymer according to claim 1, wherein the polymer block (A) is prepared by polymerizing 80% to 100% by weight of at least one monomer selected from the group consisting of acrylonitrile and methacrylonitrile and 20% to 0% by weight of at least one monomer selected from the group consisting of methacrylate esters, styrene, and α-methylstyrene.

10. The block copolymer according to claim 9, wherein the polymer block (A) is prepared by polymerizing 100% by weight of at least one monomer selected from the group consisting of acrylonitrile and methacrylonitrile.

11. The block copolymer according to claim 1, wherein the polymer block (B) is prepared by polymerizing an acrylate ester.

12. The block copolymer according to claim 1, wherein the molecular weight distribution of the polymer block (A) is 1.8 or less, the molecular weight distribution being determined by gel permeation chromatography analysis.

13. The block copolymer according to claim 1, wherein the molecular weight distribution of the block copolymer comprising the polymer block (A) and the polymer block (B) is 1.8 or less, the molecular weight distribution being determined by gel permeation chromatography analysis.

14. The block copolymer according to claim 1, wherein the glass transition temperature of the polymer block (A) is 50° C. or more.

15. The block copolymer according to claim 1, wherein the glass transition temperature of the polymer block (B) is 30° C. or less.

16. A thermoplastic resin composition comprising a thermoplastic resin and the block copolymer according to claim 1.

17. An elastomer composition comprising a synthetic rubber and the block copolymer according to claim 1.

* * * * *